United States Patent
Hu et al.

(10) Patent No.: US 11,109,005 B2
(45) Date of Patent: Aug. 31, 2021

(54) DEVICE, SYSTEM AND METHOD FOR ENHANCING ONE OR MORE OF HIGH CONTRAST REGIONS AND TEXT REGIONS IN PROJECTED IMAGES

(71) Applicant: CHRISTIE DIGITAL SYSTEMS USA, INC., Cypress, CA (US)

(72) Inventors: Xiaodan Hu, Waterloo (CA); Mohamed A. Naiel, Waterloo (CA); Zohreh Azimifar, Waterloo (CA); Ibrahim Ben Daya, Kitchener (CA); Mark Lamm, Mississagua (CA); Paul Fieguth, Waterloo (CA)

(73) Assignee: CHRISTIE DIGITAL SYSTEMS USA, INC., Cy, CA (US)

(*) Notice: Subject to any disclaimer, the term of this patent is extended or adjusted under 35 U.S.C. 154(b) by 0 days.

(21) Appl. No.: 16/829,441

(22) Filed: Mar. 25, 2020

(65) Prior Publication Data
US 2020/0336715 A1    Oct. 22, 2020

Related U.S. Application Data

(60) Provisional application No. 62/835,724, filed on Apr. 18, 2019.

(51) Int. Cl.
*H04N 5/57* (2006.01)
*H04N 9/31* (2006.01)
(Continued)

(52) U.S. Cl.
CPC .......... *H04N 9/3179* (2013.01); *G06T 5/003* (2013.01); *G06T 5/20* (2013.01); *G06T 5/50* (2013.01);
(Continued)

(58) Field of Classification Search
CPC .......... G06T 5/003; G06T 7/20; H04N 9/3179
(Continued)

(56) References Cited

U.S. PATENT DOCUMENTS 6,697,534 B1 * 2/2004 Tan ........................... G06T 5/20
                                                        382/195
6,731,821 B1 * 5/2004 Maurer .................... G06K 9/40
                                                        382/263
(Continued)

FOREIGN PATENT DOCUMENTS

EP       3297279 A1     3/2018
KR       101397009      5/2014
(Continued)

OTHER PUBLICATIONS

Barshan, Elnaz, et al., "Resolution Enhancement Based on Shifted Superposition", SID Symposium Digest of Technical Papers, 46, doi: 10.1002/sdtp.10449. Published Jul. 29, 2015 ; (2015), 35.3.
(Continued)

*Primary Examiner* — Brian P Yenke
(74) *Attorney, Agent, or Firm* — Perry + Currier, Inc.

(57) ABSTRACT

A device, system and method for enhancing high-contrast and text regions in projected images is provided. A device applies, to an input image: a high-contrast sharpening filter sharpening high-contrast regions producing a high-contrast sharpened image; and a background sharpening filter sharpening other regions of the input producing a background sharpened image, the background sharpening filter applying less sharpening than the high-contrast sharpening filter. The device: determines, using high-contrast and motion detectors, the input image and/or previous images, masks selecting stationary high-contrast regions of the input image; determines, using the masks, a background mask selecting remaining regions of the input image; applies the masks to the high-contrast sharpened image selecting stationary high- (Continued)

contrast regions therefrom; applies the background mask to the background sharpened image selecting the remaining regions therefrom; combines the stationary high-contrast and remaining regions to produce a combined enhanced image; and controls a projector to project the combined enhanced image.

20 Claims, 11 Drawing Sheets

(51) Int. Cl.
*G06T 7/11* (2017.01)
*G06T 5/20* (2006.01)
*G06T 7/20* (2017.01)
*G06T 5/50* (2006.01)
*G06T 5/00* (2006.01)

(52) U.S. Cl.
CPC .............. *G06T 7/11* (2017.01); *G06T 7/20* (2013.01); *G06T 2207/10016* (2013.01); *G06T 2207/20212* (2013.01)

(58) Field of Classification Search
USPC ........ 348/576, 678, 686, 687, 252; 382/263, 382/274, 284
See application file for complete search history.

(56) References Cited

U.S. PATENT DOCUMENTS

| | | | |
|---|---|---|---|
| 6,879,733 B2* | 4/2005 | Shu ................. | G06T 5/004 348/E5.077 |
| 6,879,734 B2* | 4/2005 | Chen ................. | G06T 5/004 348/E5.077 |
| 6,915,024 B1* | 7/2005 | Maurer .............. | G06T 5/008 382/251 |
| 7,706,633 B2 | 4/2010 | Chefd'Hotel et al. | |
| 8,289,454 B2 | 10/2012 | Hasegawa et al. | |
| 8,294,781 B2* | 10/2012 | Cote ................ | H04N 5/3572 348/222.1 |
| 8,457,429 B2* | 6/2013 | Keshet .............. | G06T 5/008 382/254 |
| 8,508,672 B2 | 8/2013 | Russell | |
| 8,532,429 B2* | 9/2013 | Segall .............. | G06T 5/004 382/275 |
| 8,731,318 B2* | 5/2014 | Keshet .............. | G06T 5/002 382/254 |
| 9,142,009 B2* | 9/2015 | Lin ................. | G06T 3/4053 |
| 9,639,956 B2* | 5/2017 | Krishnaswamy ...... | G06T 7/42 |
| 9,728,142 B2* | 8/2017 | Nicholson .......... | G09G 3/003 |
| 9,736,442 B1 | 8/2017 | Wong et al. | |
| 9,978,121 B2* | 5/2018 | Usman .............. | G06T 7/13 |
| 10,009,587 B1 | 6/2018 | Ma et al. | |
| 2002/0094128 A1* | 7/2002 | Shu ................ | G06T 5/20 382/261 |
| 2002/0094129 A1* | 7/2002 | Chen ............... | G06T 5/20 382/261 |
| 2005/0041883 A1* | 2/2005 | Maurer ............. | G06K 9/44 382/260 |
| 2005/0169553 A1* | 8/2005 | Maurer ............. | G06T 5/20 382/266 |
| 2006/0098897 A1 | 5/2006 | Dewaele | |
| 2006/0110072 A1 | 5/2006 | Domera-Venkata | |
| 2009/0034871 A1* | 2/2009 | Keshet ............. | G06T 5/20 382/274 |
| 2010/0278423 A1 | 11/2010 | Itoh | |
| 2011/0019096 A1 | 1/2011 | Lee et al. | |
| 2011/0090370 A1* | 4/2011 | Cote .............. | H04N 5/208 348/237 |
| 2011/0205227 A1* | 8/2011 | Fischer ........... | G06T 5/50 345/419 |
| 2011/0261264 A1* | 10/2011 | Zafarifar ......... | H04N 5/145 348/699 |
| 2012/0121179 A1* | 5/2012 | Keshet ........... | G06T 5/007 382/169 |
| 2012/0219229 A1 | 8/2012 | Springer et al. | |
| 2014/0341481 A1* | 11/2014 | Panetta .......... | G06T 5/50 382/274 |
| 2015/0036943 A1* | 2/2015 | Lin ............... | G06T 3/4053 382/264 |
| 2015/0178946 A1* | 6/2015 | Krishnaswamy .... | G06T 7/42 345/582 |
| 2016/0239942 A1* | 8/2016 | Usman ............ | G06T 5/00 |

FOREIGN PATENT DOCUMENTS

KR 101397009 B1 5/2014
KR 20160038554 A 4/2016

OTHER PUBLICATIONS

Hisham, M.B., et al, "Template Matching Using Sum of Squared Difference and Normalized Cross Correlation", 2015 IEEE Student Conference on Research and Development (SCOReD), pp. 100-1004, 2015 IEEE Published Dec. 13, 2015.
Rath, Toni M., et al., "Word Image Matching Using Dynamic Time Warping", Multi-Media Indexing and Retrieval Group, Center for Intelligent Information Retrieval, University of Massachusetts, 2003 IEEE Computer Society Conference on Computer Vision and Pattern Recognition, 2003, Proceedings, pp. 1-7. Published Jun. 18, 2003.
Wolberg, George, et al., "Robust Image Registration Using Log-Polar Transform", Department of Computer Science, City College of New York, Proceedings. 2000 International Conference on Image Processing, 2000. vol. 1, pp. 493-496, Published Sep. 10, 2000.
Adobe Systems Inc., Adobe Photoshop CS2 User Guide, Chapter 13:Transforming and retouching; Chapter 14: Layers Ed., May 1, 2005.

* cited by examiner

901

902

DEVICE, SYSTEM AND METHOD FOR ENHANCING ONE OR MORE OF HIGH CONTRAST REGIONS AND TEXT REGIONS IN PROJECTED IMAGES

CROSS-REFERENCE TO RELATED APPLICATIONS

This application claims priority to U.S. Provisional Patent Application No. 62/835724, filed Apr. 18, 2019, the entirety of which is incorporated herein by reference.

BACKGROUND

The resolution of some personal and/or commercial digital cameras is usually higher than that of current prevalent commercial grade projectors. For example, industrial projectors of high definition resolution may be used to project videos of resolution 4K in cinemas, and the like, which is of a higher resolution than many current commercial grade projectors which are more commonly used by consumers. However, even though high resolution projectors are available for consumers, they are still too expensive. Thus, using a projector of lower native resolution to project videos of higher resolution is of interest, since such an approach can significantly reduce the cost of projector display systems, even in industrial grade projectors. Many super resolution (SR) methods have been proposed to achieve higher resolution projection by superimposing images. However, currently, most SR methods only consider real images as being uniform and stationary (e.g. the images include identical stationary objects). This assumption can cause some artifacts in visualization because images are generally non-stationary containing different features/contents such as text, motion and background contents.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1A:
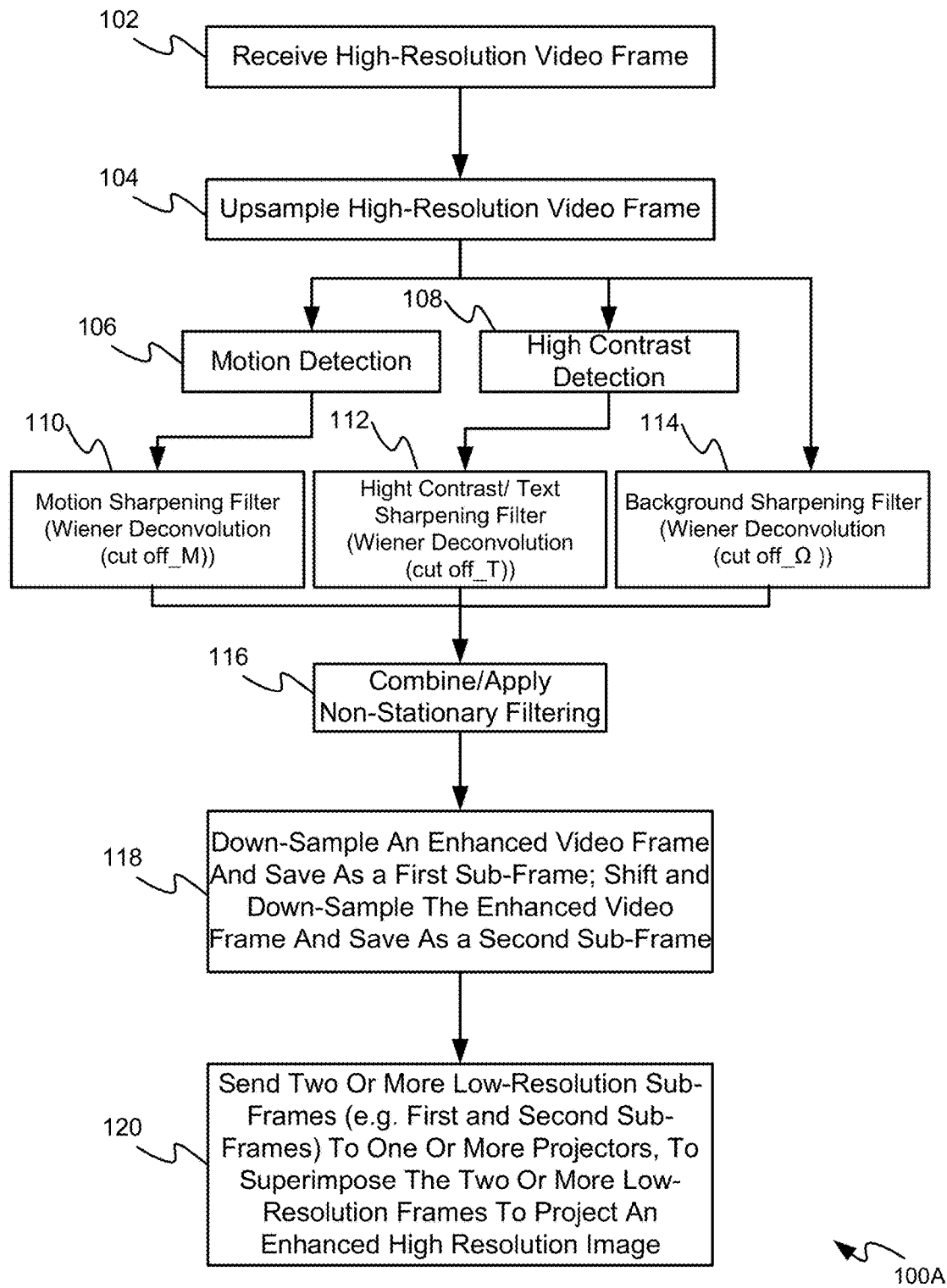
FIG. 1A depicts a method to enhance high-contrast, motion and background regions of an input image differently based on the high-contrast, motion and background masks, according to non-limiting examples.

The resolution of some personal and/or commercial digital cameras is usually higher than that of current prevalent commercial grade projectors. For example, industrial projectors of high definition resolution may be used to project videos of resolution 4K in cinemas, and the like, which is of a higher resolution than many current commercial grade projectors which are more commonly used by consumers. However, even though high resolution projectors are available for consumers, they are still too expensive. Thus, using a projector of lower native resolution to project videos of higher resolution is of interest, since such an approach can significantly reduce the cost of projector display systems, even in industrial grade projectors. Many super resolution (SR) methods have been proposed to achieve higher resolution projection by superimposing images. However, currently, most SR methods only consider real images as being uniform and stationary (e.g. the images include identical stationary objects). This assumption can cause some artifacts in visualization because images are generally non-stationary containing different features/contents such as text, motion and background contents. Therefore, there is a need to develop new methods to enhance the images differently based on their contents.

Several methods may be used to achieve this goal. One method is to use a low-resolution projection system with an optomechanical image shifter to reproduce high-resolution content on a given screen, to superimpose two low resolution images in rapid succession to reconstruct a higher resolution image. This model generates a higher resolution image using low-resolution sub-images and several enhancement methodologies may be based on this method. For example, one of these resolution enhancement methods is called shifted superposition (SSPOS), in which a pair of spatially shifted low-resolution sub-images are projected. Although these methods may increase the perceived image resolution, they do not consider the blurring effect caused by a projector-lens system. A spatial-based resolution enhancement method has also been proposed by introducing a Wiener deconvolution filtering rather than a frequency-domain/2D-DFT (Discrete Fourier Transform) operation; for reasons of simplicity the Wiener filter kernel may be approximated in the spatial domain.

Although both SSPOS and the Wiener deconvolution based enhancement methods can work well for still images, in videos both methods introduce temporal motion artifacts due to their inherent sharpening operation. These artifacts (e.g., flickering and aliasing) are associated with moving, high contrast, detailed texture, and time-non-stationarity/ sequencing introduced by the superimposed projection. The artifacts may be present, but not obvious, in still images, however they may be highly distracting/visually intolerable in videos. A simple and effective method to reduce these artifacts may be to apply blurring on the whole image, but which may be a self-defeating solution in a method aiming to offer increased resolution for moving and non-moving regions. In addition, effective filtering for high-contrast regions tends to create artifacts in other contents, and effective filtering for other image contents tends to under-enhance high-contrast regions. Thus, effective enhancement of high-contrast, motion and other imagery regions may be of significant importance and may represent significant added value for projector display systems. Furthermore, though content-adaptive enhancement schemes have been proposed, they lack how to classify a given video frame into different content classes, and how to combine different enhanced contents into a final enhanced frame.

In the present specification, a content-adaptive projector resolution enhancement scheme is provided. Given an input video frame, pixels of an image (e.g., all pixels of the video frame) may be classified into a high-contrast class, a motion class or a background class. This multi-classification may be performed using two binary classification techniques to obtain high-contrast masks and motion masks, while background masks may be obtained by complimenting the union of the high-contrast masks and motion masks. A smoothing technique may be used on these masks, resulting in smoothed masks, in order to avoid sharp transitions between regions of different classes. A high-contrast mask is obtained on the basis of computing the local statistics of regions having a bi-modal distribution, allowing a pixel-wise classification into a high-contrast class or a not-high-contrast class. The moving regions may be obtained by computing local statistics to classify pixels (e.g. every pixel of the video frame) into a moving class or non-moving class. The projector resolution may be enhanced by using three Wiener deconvolution filters with low, medium, and high cut-off frequencies (e.g. relative to each other) for motion, background and high-contrast regions, respectively. A final enhanced frame may be obtained by using a non-stationary scheme in which element-wise multiplication between the filtered frames and their corresponding smoothed masks is employed, and a normalized weighted average is used to obtain an enhanced video frame that is ready for projection. This content-adaptive enhancement generally provides sharpening of high-contrast regions that is higher than sharpening of background regions, while avoiding over-sharpening moving regions which may cause temporal motion artifacts. As a result, better visual quality for projected video frames may occur as compared to of projection without enhancement.

An aspect of the present specification provides a device comprising: a controller and a communication interface configured to communicate with at least one projector, the controller having access to a memory storing: a high-contrast sharpening filter configured to sharpen high-contrast regions in images, the high-contrast regions including text regions when present in the images; and a background sharpening filter configured to sharpen other regions of the images different from the high-contrast regions, the background sharpening filter further configured to apply less sharpening to the images than the high-contrast sharpening filter; the controller configured to: receive an input image from a video stream; apply the high-contrast sharpening filter to the input image to produce a high-contrast sharpened image; apply the background sharpening filter to the input image to produce a background sharpened image; determine, using at least a high-contrast detector, a motion detector and one or more of the input image and previous images from the video stream, one or more masks that select stationary high-contrast regions of the input image, the stationary high-contrast regions including stationary text-regions when present in the input image; determine, using at least the one or more masks, a background mask that selects remaining regions of the input image different from respective regions of the input image selected by the one or more masks; apply the one or more masks to the high-contrast sharpened image to select the stationary high-contrast regions from the high-contrast sharpened image; apply the background mask to the background sharpened image to select the remaining regions from the background sharpened image; combine the stationary high-contrast regions from the high-contrast sharpened image and the remaining regions from the background sharpened image to produce a combined enhanced image; and control, using the communication interface, the at least one projector to project the combined enhanced image.

Another aspect of the present specification provides a method comprising: receiving, at a device, an input image from a video stream; applying, at the device, a high-contrast sharpening filter to the input image to produce a high-contrast sharpened image, the high-contrast sharpening filter configured to sharpen high-contrast regions in images, the high-contrast regions including text regions when present in the images; applying, at the device, a background sharpening filter to the input image to produce a background sharpened image, the background sharpening filter configured to sharpen other regions of the images different from the high-contrast regions, the background sharpening filter further configured to apply less sharpening to the images than the high-contrast sharpening filter; determining, at the device, using at least a high-contrast detector, a motion detector and one or more of the input image and previous images from the video stream, one or more masks that select stationary high-contrast regions of the input image, the stationary high-contrast regions including stationary text-regions when present in the input image; determining, at the device, using at least the one or more masks, a background mask that selects remaining regions of the input image different from respective regions of the input image selected by the one or more masks; applying, at the device, the one or more masks to the high-contrast sharpened image to select the stationary high-contrast regions from the high-contrast sharpened image; applying, at the device, the background mask to the background sharpened image to select the remaining regions from the background sharpened image; combining, at the device, the stationary high-contrast regions from the high-contrast sharpened image and the remaining regions from the background sharpened image to produce a combined enhanced image; and controlling, at the device, at least one projector to project the combined enhanced image.

Another aspect of the present specification provides a non-transitory computer-readable medium storing a computer program, wherein execution of the computer program is for: receiving, at a device, an input image from a video stream; applying, at the device, a high-contrast sharpening filter to the input image to produce a high-contrast sharpened image, the high-contrast sharpening filter configured to sharpen high-contrast regions in images, the high-contrast regions including text regions when present in the images; applying, at the device, a background sharpening filter to the input image to produce a background sharpened image, the background sharpening filter configured to sharpen other regions of the images different from the high-contrast regions, the background sharpening filter further configured to apply less sharpening to the images than the high-contrast sharpening filter; determining, at the device, using at least a high-contrast detector, a motion detector and one or more of the input image and previous images from the video stream, one or more masks that select stationary high-contrast regions of the input image, the stationary high-contrast regions including stationary text-regions when present in the input image; determining, at the device, using at least the one or more masks, a background mask that selects remaining regions of the input image different from respective regions of the input image selected by the one or more masks; applying, at the device, the one or more masks to the high-contrast sharpened image to select the stationary high-contrast regions from the high-contrast sharpened image; applying, at the device, the background mask to the background sharpened image to select the remaining regions from the background sharpened image; combining, at the device, the stationary high-contrast regions from the high-contrast sharpened image and the remaining regions from the background sharpened image to produce a combined enhanced image; and controlling, at the device, at least one projector to project the combined enhanced image.

System Overview

Attention is next directed to FIG. 1A which depicts a method 100A to enhance high-contrast, motion and background regions of an input image differently based on the high-contrast, motion and background masks, according to non-limiting examples. It is understood that the method of FIG. 1A may be implemented in any of the devices and/or systems of FIG. 2, FIG. 3 and FIG. 4 and, in particular, by respective controllers thereof, described in more detail below. The method 100A may be implemented on variations of the systems of FIG. 2, FIG. 3 and FIG. 4, as well. Furthermore, the method 100A need not be performed in the exact sequence as shown and likewise various blocks may be performed in parallel rather than in sequence. Accordingly, the components of the method 100A are referred to herein as "blocks" rather than "steps."

As shown in FIG. 1A, high-contrast, motion and background regions of video frames may be enhanced differently based on high-contrast, motion and background masks, three class-dependent Wiener deconvolution filters, and the like, of different sharpening levels for high-contrast, motion and background regions, and non-stationary filtering to generate final enhanced frame by smoothly combining differently enhanced regions together.

For example, at a block 102, a controller and/or device receives a high-resolution video frame and/or image (referred to hereafter as the high-resolution video frame). For example, a high-resolution video frame may have a higher resolution than a projector that is to project the video frame and/or image (e.g. see any of FIG. 2, FIG. 3 and FIG. 4). Indeed, the term "high-resolution" may be understood to be relative to a resolution and/or a native resolution of a projector that is to project images using the high-resolution video frame, as described in more detail below. Furthermore, the video frame may be received in a video stream.

At a block 104, the controller and/or the device optionally up-samples the high-resolution video frame, for example to produce a higher-resolution video frame (e.g. relative to the high-resolution video frame). The controller and/or the device may up-sample the high-resolution video frame using any suitable up-sampling scheme to produce the higher-resolution video frame of any suitable resolution.

At a block 106 and a block 108, the controller and/or the device determines and/or detects, respectively, regions of motion (e.g. motion regions) and regions of high contrast (e.g. high contrast regions) in the higher-resolution video frame. Such detection is described in more detail below. However, in particular, high contrast regions may be understood to correspond to regions of text as generally text in a video frame includes black (and/or darker) text against a white (and/or lighter) background, and/or vice versa. In particular, a high contrast mask may be generated which selects high contrast regions from the higher-resolution video frame, and similarly a motion mask may be generated which selects motion regions from the higher-resolution video frame. Furthermore, where a region of the higher-resolution video frame includes both high-contrast and motion regions, a weighting scheme may be used to adjust the respective masks, as described in more detail below.

While not depicted, the controller and/or the device may further determine background regions using the motion regions and the high contrast regions; for example, regions of the higher-contrast video frame that do not correspond to the motion regions and the high contrast regions may comprise background regions. Various schemes for determining background regions are described below. However, in general, a compliment of the union between the high contrast mask and the motion mask may be used to generate a background mask which selects background regions from the higher-resolution video frame.

At a block 110, the controller and/or the device applies a motion sharpening filter to the regions of motion using, for example a Wiener Deconvolution with a cut-off "M" (e.g. "cut off_M") selected to sharpen motion. Hence, sharpened motion regions may be generated. However, in other examples, the controller and/or the device may apply the motion sharpening filter to the entirety of the higher-contrast video frame and select sharpened motion regions from a motion sharpened higher-contrast video frame. However, in some examples motion may not be detected in a video frame, and hence the block 110 may be optional. Hence, while it is assumed hereafter that at least one motion region is detected, it is understood that when motion regions are not detected the block 110 may not be implemented.

Similarly, at a block 112, the controller and/or the device applies a high contrast and/or text sharpening filter to the regions of high contrast using, for example a Wiener Deconvolution with a cut-off "T" (e.g. "cut off_T") selected to sharpen text. Hence, sharpened high contrast and/or text regions may be generated. However, in other examples, the controller and/or the device may apply the high contrast and/or text sharpening filter to the entirety of the higher-contrast video frame and select sharpened high contrast regions from a high contrast and/or text sharpened higher-contrast video frame. However, in some examples high contrast may not be detected in a video frame, and hence the block 112 may be optional. Hence, while it is assumed hereafter that at least one high contrast region is detected, it is understood that when high contrast regions are not detected the block 112 may not be implemented.

At a block 114, the controller and/or the device applies a background sharpening filter to one or more of background regions and the higher resolution video frame using, for example a Wiener Deconvolution with a cut-off "B" (e.g. "cut off_T") selected to sharpen a background. In examples where the background sharpening filter is applied to the entire higher resolution video frame, the sharpened background regions may be determined using the motion regions and the high contrast regions (and/or the sharpened motion regions and the sharpened high contrast regions); for example, a complement of the union of the high-contrast and motion regions, and/or a complement of the union of a high-contrast mask and a motion mask, may be used to determine the background regions and/or a background mask (e.g. regions that are not high-contrast regions and not motion regions may be background regions). For example regions of a video frame that are not motion regions and not high contrast regions may be background regions.

Furthermore, as described in more detail below, while motion regions may be detected, in some examples a motion sharpening filter may be optional such that two sharpening filters may be applied: a high-contrast and/or text sharpening filter and a background sharpening filter (e.g. see FIG. 2). However, in other examples, two or more of a motion sharpening filter, a high-contrast and/or text sharpening filter and a background sharpening filter may be applied to respective regions.

At a block 116, the controller and/or the device sums and/or combines the sharpened motion regions, the sharpened high contrast regions, and the sharpened background regions to produce an enhanced video frame, and applies non-stationary filtering for example to mitigate and/or smooth any sharp boundaries between regions of different contents (e.g. when a moving region and a high-contrast region are adjacent). Such non-stationary filtering is described in more detail below. Regardless, at the block 116, an enhanced video frame (e.g. an enhanced image) is generated which has motion sharpened regions, high contrast sharpened regions (e.g. text sharpened regions) and background sharpened regions.

At a block 118, the controller and/or the device downsamples the enhanced video frame to produce a first sub-frame, which may be saved, at least temporarily, in a memory (e.g. a volatile memory). Similarly, also at the block 118, the controller and/or the device shifts (e.g. by a given number of pixels in one or more directions) and downsamples the enhanced video frame to produce a second sub-frame, which may be saved, at least temporarily, in a memory (e.g. a volatile memory). It is understood that the first and second sub-frames correspond to lower resolution frames that are of lower resolution than the original high-resolution video frame received at the block 102. In particular, the first and second sub-frames may be at a resolution and/or a native resolution of a projector that is to project the first and second sub-frames; regardless, the resolution of the first and second sub-frames is generally compatible with the projector that is to project the first and second sub-frames, with the down-sampling resolution and shifting selected accordingly.

Furthermore, while only two low-resolution sub-frames are described as being generated, at the block 118, the controller and/or the device may generate two or more sub-frames, for example by applying more than one shift (e.g. at different numbers of pixels) to the enhanced video frame.

At a block 120, the controller and/or the device sends and/or transmits and/or provides two or more low-resolution frames (e.g. the first and second sub-frames generated at the block 118) to one or more projectors for projection. In particular, a projector superimposes the two or more low-resolution frames to project an enhanced high resolution image.

Figure 1B:
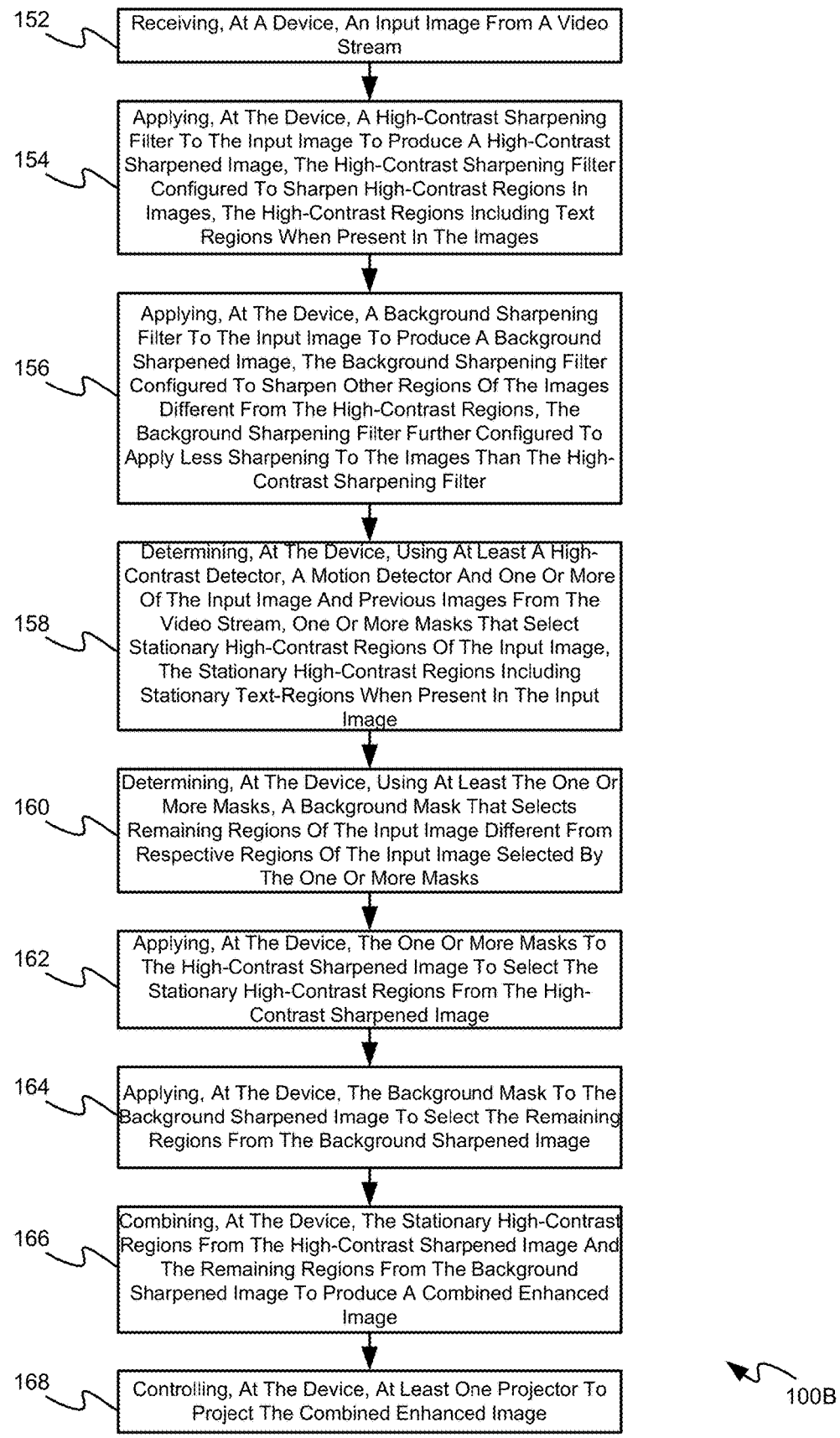
FIG. 1B depicts a method to enhance high-contrast, motion and background regions of an input image differently based on the high-contrast, motion and background masks, according to further non-limiting examples.

Attention is next directed to FIG. 1B which depicts a method 100B to enhance high-contrast, motion and background regions of an input image differently based on high-contrast, motion and background masks, according to further non-limiting examples. It is understood that the method of FIG. 1B may be implemented in at least the device and/or systems of FIG. 2 and FIG. 4, in particular, by respective controllers thereof. The method 100B may be implemented on variations of the systems of FIG. 2 and FIG. 4 (e.g. and/or variations of the system of FIG. 3), as well. Furthermore, the method 100B need not be performed in the exact sequence as shown and likewise various blocks may be performed in parallel rather than in sequence. Accordingly, the components of the method 100B are referred to herein as "blocks" rather than "steps."

As shown in FIG. 1B, high-contrast, motion and background regions of video frames may be enhanced differently. In general, the method 100B may represent a more specific version of the method 100A.

For example, at a block 152, a controller and/or device receive an input image from a video stream. For example, the input image may comprise a video frame of the video stream (e.g. similar to the video frame of the method 100A).

At a block 154, the controller and/or device applies a high-contrast (and/or text) sharpening filter to the input image to produce a high-contrast sharpened image, the high-contrast sharpening filter configured to sharpen high-contrast regions in images, the high-contrast regions including text regions when present in the images.

At a block 156, the controller and/or device applies a background sharpening filter to the input image to produce a background sharpened image, the background sharpening filter configured to sharpen other regions of the images different from the high-contrast regions, the background sharpening filter further configured to apply less sharpening to the images than the high-contrast sharpening filter. While throughout the present specification, Wiener deconvolution filters are used as sharpening filters, any suitable type of sharpening filters may be used.

At a block 158, the controller and/or device determines, using at least a high-contrast detector, a motion detector and one or more of the input image and previous images from the video stream, one or more masks that select stationary high-contrast regions of the input image, the stationary high-contrast regions including stationary text-regions when present in the input image. Selection of stationary high-contrast regions of the input image are described in more detail below. Hence, in the method 100B, stationary high-contrast regions are specifically determined.

At a block 160, the controller and/or device determines, using at least the one or more masks, a background mask that selects remaining regions of the input image different from respective regions of the input image selected by the one or more masks. For example, as described above, masks for selecting high-contrast and motion regions may be generated and an intersection thereof may be used to determine the background mask; put another way, the background mask may be an inverse of a union between a high-contrast mask and a motion mask.

At a block 162, the controller and/or device applies the one or more masks to the high-contrast sharpened image to select the stationary high-contrast regions from the high-contrast sharpened image.

At a block 164, the controller and/or device applies a background mask to the background sharpened image to select the remaining regions from the background sharpened image.

Furthermore, the one or more masks of the block 158, and the background mask of the block 164, may include one or more of a high-contrast mask and a motion mask, and the background mask. Indeed, depending on the architecture of how the method 100B is implemented, different types of masks may be determined including, but not limited to: a stationary high-contrast mask that selects stationary high-contrast regions, and a background mask that selects all other regions (e.g. as in the system of FIG. 2); a stationary high-contrast mask that selects stationary high-contrast regions, a motion mask that selects motion regions, and a background mask that selects all other regions (e.g. as in the system of FIG. 4); and a high-contrast mask that selects high-contrast regions, a motion mask that selects motion regions, and a background mask that selects all other regions, with the high-contrast mask and the motion mask being weighted to distinguish between stationary and moving high-contrast regions (e.g. as in the system of FIG. 3).

At a block 166, the controller and/or device combines the stationary high-contrast regions from the high-contrast sharpened image and the remaining regions from the background sharpened image to produce a combined enhanced image.

At a block 168, the controller and/or device controls at least one projector to project the combined enhanced image.

Figure 2:
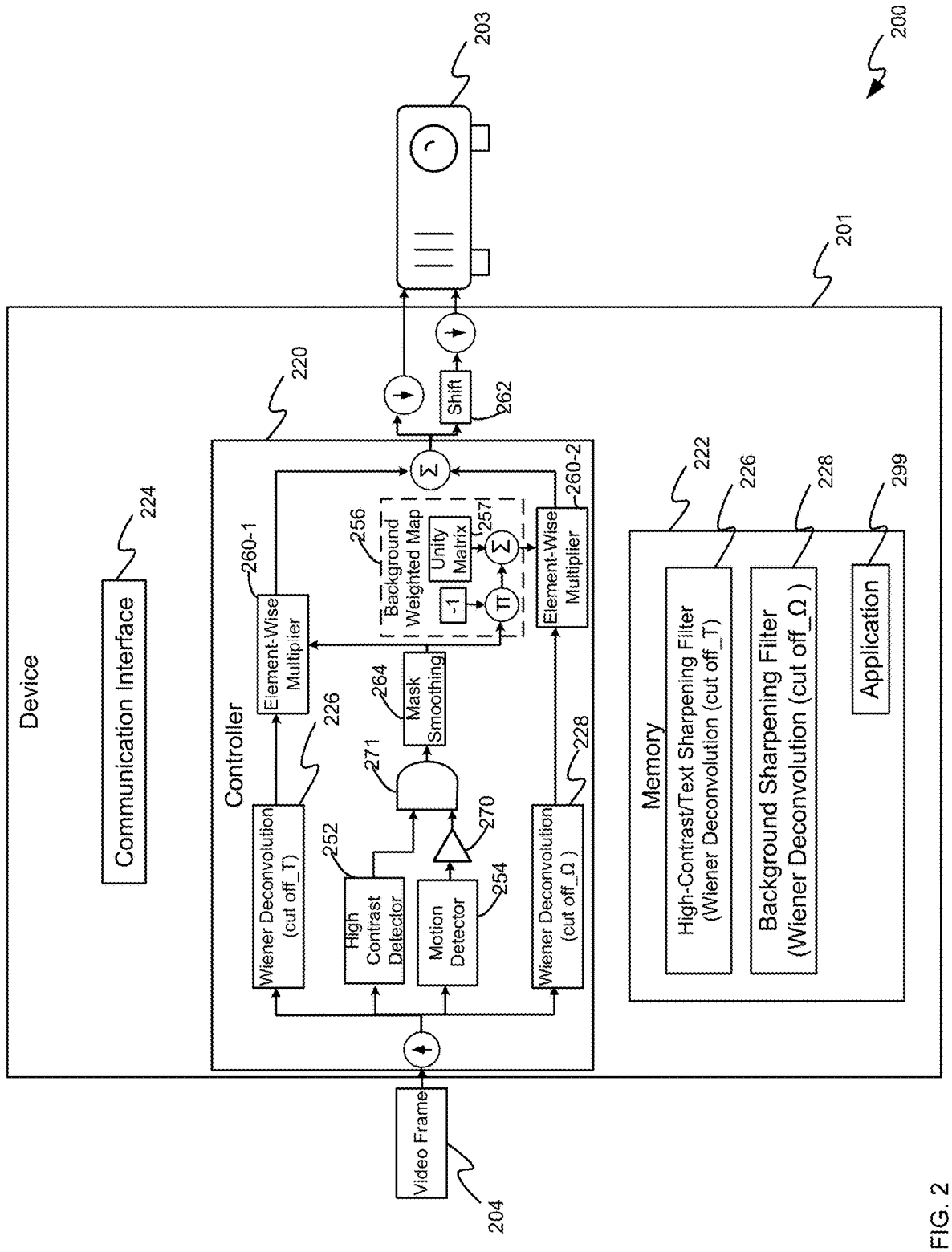
FIG. 2 depicts a system and device to enhance static high-contrast and background regions of an input image differently based on the high-contrast, motion and background masks, according to non-limiting examples.
Figure 3:
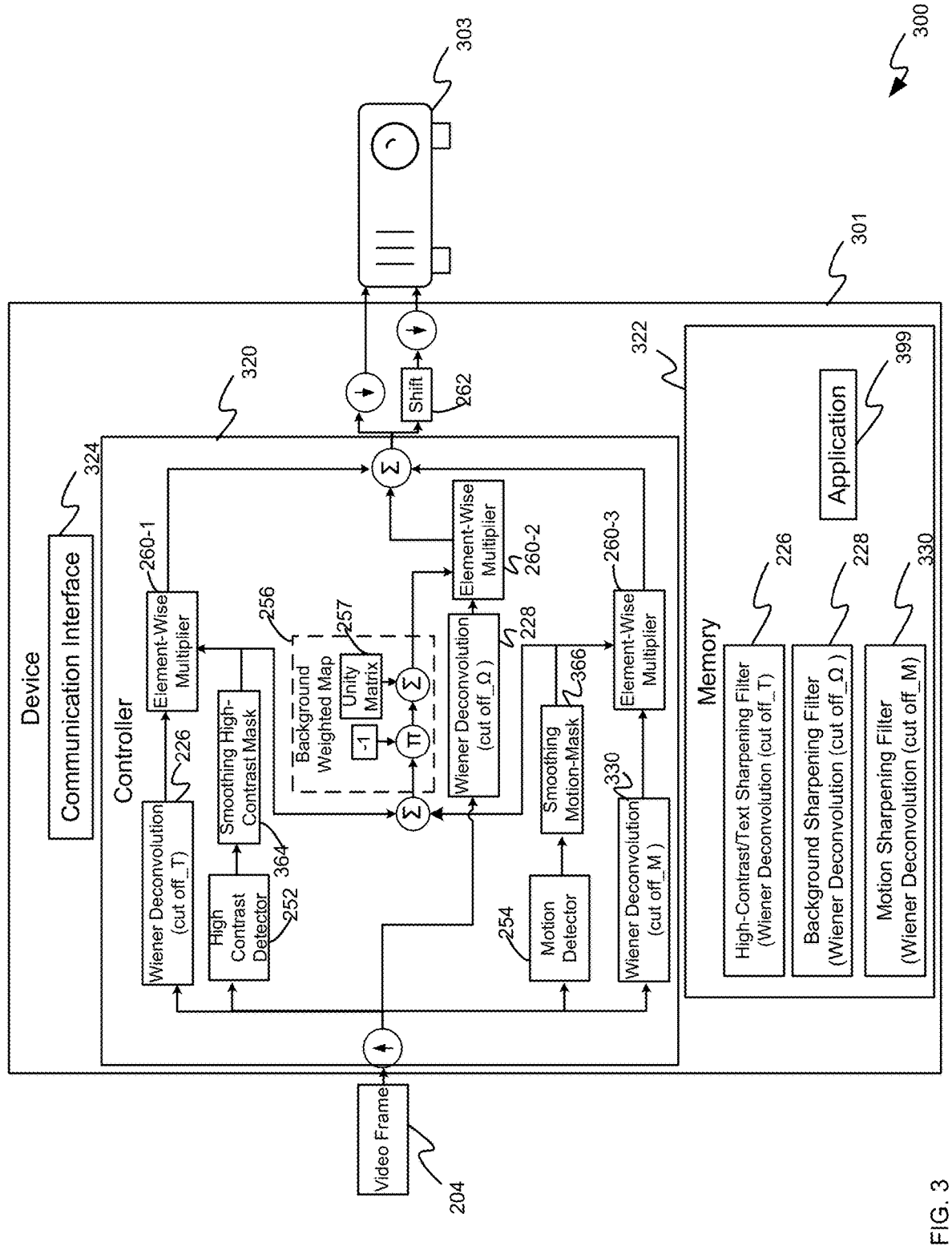
FIG. 3 depicts another system and device to enhance high-contrast, motion and background regions of an input image differently based on the high-contrast, motion and background masks, according to non-limiting examples.
Figure 4:
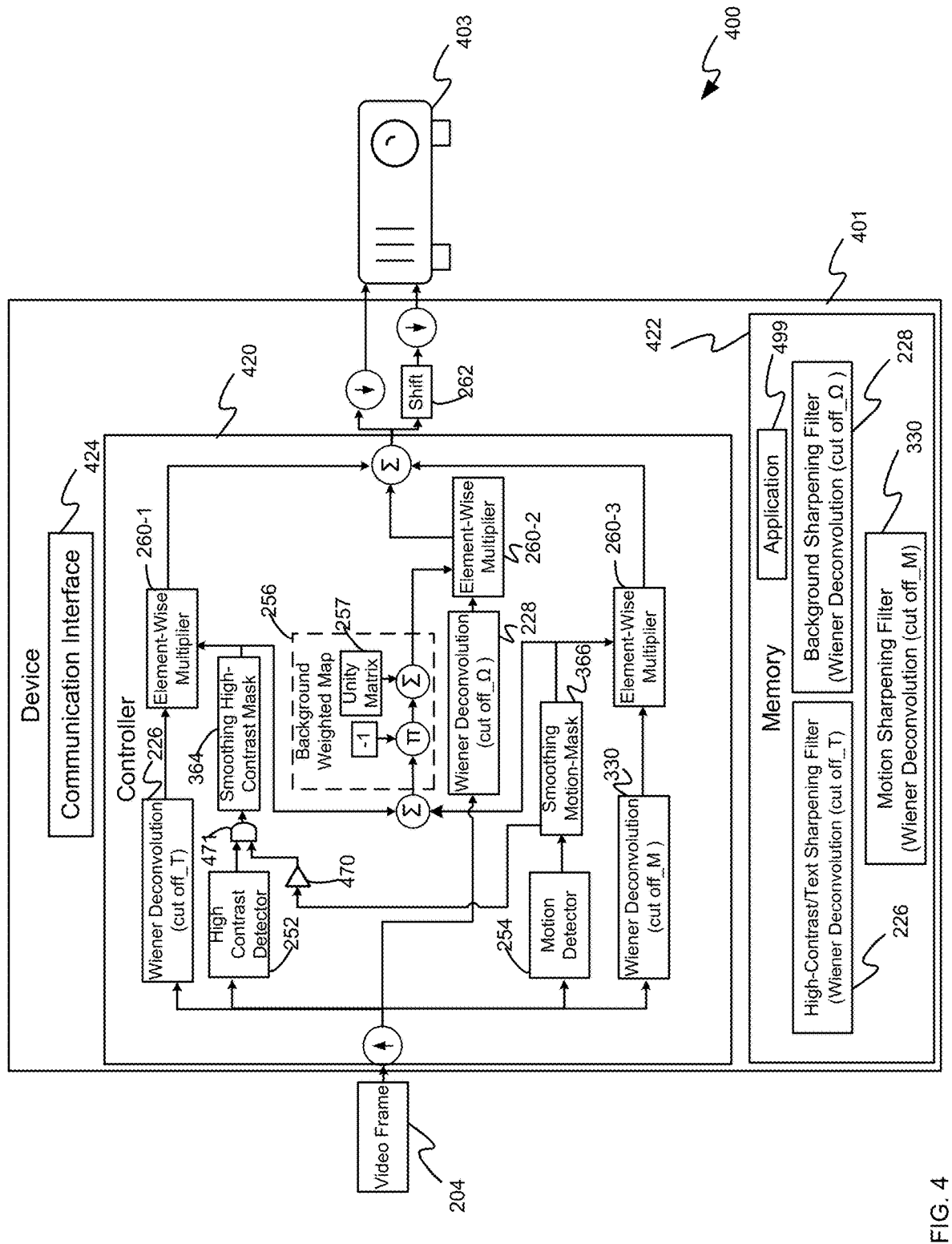
FIG. 4 depicts another system and device to enhance static high-contrast, motion and background regions of an input image differently based on the high-contrast, motion and background masks, according to non-limiting examples.

Hence, while three filters (e.g. motion, high contrast and background filters) are described with respect to the method 100A in some examples, two filters may be used as in the method 100B (e.g. high contrast and background filters) Hence, in the present specification, two filter-based and three filter-based enhancement schemes within a high-resolution superimposed projection framework are provided, which may consist of three components, as shown in FIG. 2, FIG. 3 and FIG. 4: (a) detection of high-contrast, motion and background regions, (b) Wiener deconvolution filtering (e.g. using two Wiener deconvolution filters or three Wiener deconvolution filters), and (c) non-stationary filtering to obtain the final enhanced frame.

In particular, FIG. 2, FIG. 3 and FIG. each depict a respective system 200, 300, 400 comprising respective devices 201, 301, 401 in communication with respective projectors 203, 303, 403. As depicted, each of the devices 201, 301, 401 are receiving a video frame 204 (e.g. an input image), for example from a video source (not depicted). As depicted, each of the devices 201, 301, 401 comprise a respective controller 220, 320, 420, a respective memory 222, 322, 422 and a respective communication interface 224, 324, 424. The video frame 204 may be received via a respective communication interface 224, 324, 424.

As depicted, the memories 222, 322, 422 store a high-contrast and/or text sharpening filter 226 (referred to interchangeably hereafter as the high-contrast filter 226) and a background sharpening filter 228, and the memories 322, 422 further store a motion sharpening filter 330. The filters 226, 228, 330 are used by the controllers 220, 320, 420 to implement the method 100A.

The controllers 220, 320, 420 further implement a high-contrast and/or text detector 252 (referred to interchangeably hereafter as the high-contrast filter 226) and a motion detector 254, and further implement a background weighted map function 256 that includes using a unity matrix 257 and a number "−1" used to manipulate the various sub-images and/or sub-frames received as input to the background weighted map function 256 using summation and multiplication functions, represented in FIG. 2, FIG. 3 and FIG. 4, respectively, by "Σ" in a circle, and "π" in a circle. In general, the background weighted map function 256 receives a mask as input, and generates a complementary mask as output.

Such functions are used elsewhere by the controllers 220, 320, 420; for example, a summation function, is used to generate output to the projectors 203, 303, 403.

The controllers 220, 320, 420 further implement various up-sampling and down-sampling functions, represented in FIG. 2, FIG. 3 and FIG. 4, respectively, by an "up" arrow in a circle, and by an "down" arrow in a circle. The controllers 220, 320, 420 further implement a shift function 262.

The controllers 220, 320, 420 further implement various element-wise multiplier functions 260-1, 260-2, 260-3 (interchangeably referred to hereafter, collectively, as the element-wise multiplier functions 260 and, generically, as an element-wise multiplier function 260) which may receive masks generated by the controllers 220, 320, 420 to select respective regions from images, as described in more detail below. The controller 220 further implements an optional mask smoothing function 264 (which may be stored in the memory 222), while the controllers 320, 420 implement an optional smoothing high-contrast mask function 364 and an optional smoothing motion mask function 366 (which, while not depicted, may be stored in the memories 322, 422).

The systems 200, 400 and devices 201, 401 depicted in FIGS. 2 and 4 represents a simplified version of the system 300 and device 301 depicted in FIG. 3.

In particular, in FIG. 3, the depicted components apply respective filters 226, 228, 330 to high contrast (e.g. text) regions of the video frame 204, motion regions of the video frame 204 (e.g. also including moving text and other moving regions that are not text) and background regions of the video frame 204 (e.g. regions that are not text or not moving portions). Furthermore a weighting scheme is applied to select contributions of the high contrast/text filter 226 and the motion sharpening filter 330, for example to moving text regions (as well as other regions), for example using the element-wise multiplier functions 260, which are adapted accordingly for each of the filters 226, 330.

In FIG. 2, the high contrast/text filter 226 is applied to moving text, and the background filter 228 is applied to other regions.

In FIG. 4, the high contrast/text filter 226 is applied to static text (e.g. not moving text), the motion sharpening filter 330 is applied to moving regions (including moving text) and the background filter 228 is applied to other regions. For example, in FIG. 4, the controller 420 implements an inverter 470 and an AND gate 471 below the block of High-Contrast Detector 252 in order to avoid sharpening moving text, as compared to FIG. 3. An inverter 270 and an AND gate 271 are also used in system 200 to combine output from the high contrast detector 252 and the motion detector 254.

The systems 200, 300, 400 and devices 201, 301, 401 will next be described in more detail.

Each of the systems 200, 300, 400 of FIG. 2, FIG. 3 and FIG. 4 include the respective devices 201, 301, 401 which includes a respective controller 220, 320, 420 and a respective communication interface 224, 324, 424 configured to communicate with at least one projector 203, 303, 403, the respective controllers 220, 320, 420 having access to a respective memory 222, 322, 422.

As depicted in FIG. 2, the memory 222 stores a high-contrast or text sharpening filter (referred to hereafter as the high-contrast filter 226) configured to sharpen one or more of high-contrast regions and text regions in images (e.g. text regions may generally be high-contrast regions); and a background sharpening filter 228 configured to sharpen other regions of the images different from one or more of the high-contrast regions and/or the text regions, the background sharpening filter further 228 configured to apply less sharpening to the images than the high-contrast sharpening filter 226.

The memory 322 of FIG. 3 further stores a motion sharpening filter 330 configured to sharpen motion in images, the motion sharpening filter 330 configured to apply less sharpening to the images than that of the high-contrast sharpening filter 226 and the background sharpening filter 228.

In FIG. 3 and FIG. 4, a motion mask generated using the motion sharpening filter 330 is used to filter out moving text and/or moving high contrast features from the high-contrast regions of the video frame 204. Furthermore, each of the systems 200, 300, 400 of FIG. 2, FIG. 3 and FIG. 4 can be different from one another or the systems 200, 300, 400 of FIG. 2, FIG. 3 and FIG. 4 may comprise the same system operating in different modes.

Each the devices 201, 301, 401 of FIG. 2, FIG. 3 and FIG. 4 (which may be the same device or different devices), may comprise any suitable computing device, including but not limited to a graphics processing unit (GPU), a graphics processing device, a graphics processing engine, a video processing device, a personal computer (PC), a server, and the like. While the memories 222, 322, 422 of FIG. 2, FIG. 3 and/or FIG. 4 is depicted as internal to a respective device 201, 301, 401, the memories 222, 322, 422 may be external to a respective device 201, 301, 401 and a respective controller 220, 320, 420 may have access to a respective memory 222, 322, 422 via a respective communication interface 224, 324, 424.

The communication interfaces 224, 324, 424 of each of the devices 201, 301, 401 of FIG. 2, FIG. 3 and/or FIG. 4 may comprise any suitable wired or wireless communication interface configured to communicate with a respective projector 203, 303, 403 (and a respective device from which the video frame 204 is received). A communication interface 224, 324, 424 may communicate in a wired and/or wireless manner as desired including, but not limited using cables, WiFi communication links, Bluetooth™ communication links, personal area networks, local area networks, and the like.

A controller 220, 320, 420 of each of the devices 201, 301, 401 of FIG. 2, FIG. 3 and/or FIG. 4 can comprise a processor and/or a plurality of processors, including but not limited to one or more central processors (CPUs) and/or one or more graphics processing units (GPUs) and/or one or more processing units; either way, a controller 220, 320, 420 of the present specification comprises a hardware element and/or a hardware processor. Indeed, in some implementations, a controller 220, 320, 420 of the present specification can comprise an ASIC (application-specific integrated circuit) and/or an FPGA (field-programmable gate array) specifically configured for sharpening one or more of high-contrast regions and text regions in projected images. Hence, each of the devices 201, 301, 401 of FIG. 2, FIG. 3 and/or FIG. 4 may not be a generic computing device, but a device specifically configured to implement specific functionality for sharpening one or more of high-contrast regions and text regions in projected images. For example, the devices 201, 301, 401 and/or the controllers 220, 320, 420 of each of FIG. 2, FIG. 3 and/or FIG. 4 can specifically comprise a computer executable engine configured to implement functionality for sharpening one or more of high-contrast regions and text regions in projected images.

The memory 222, 322, 422 of each of the devices of FIG. 2, FIG. 3 and/or FIG. 4 can comprise a non-volatile storage unit (e.g. Erasable Electronic Programmable Read Only Memory ("EEPROM"), Flash Memory) and a volatile storage unit (e.g. random-access memory ("RAM")). Programming instructions that implement the functional teachings of a device 201, 301, 401 as described herein are typically maintained, persistently, in a respective memory 222, 322, 422 and used by a respective controller 220, 320, 420 which makes appropriate utilization of volatile storage during the execution of such programming instructions. Those skilled in the art recognize that the memory 222, 322, 422 of each of the devices 201, 301, 401 of FIG. 2, FIG. 3 and/or FIG. 4 is an example of computer readable media that can store programming instructions executable on a respective controller. Furthermore, the memory 222, 322, 422 of each of the devices 201, 301, 401 of FIG. 2, FIG. 3 and/or FIG. 4 is also an example of a memory unit and/or memory module and/or a non-volatile memory.

In particular, a memory 222, 322, 422 stores a respective application 299, 399, 499 that, when processed by a respective controller 220, 320, 420, enables a respective controller 220, 320, 420 and/or a respective device 201, 301, 401 to implement at least the blocks of the method 100A and/or the method 100B and/or any other suitable methods of the present specification.

In a particular example, when the applications 299, 399, 499 are processed by a respective controller 220, 320, 420, the respective controllers 220, 320, 420 and/or the devices 201, 301, 401 are enabled to: receive an input image from a video stream; apply a high-contrast sharpening filter to the input image to produce a high-contrast sharpened image, high-contrast sharpening filter configured to sharpen high-contrast regions in images, the high-contrast regions including text regions when present in the images; apply the background sharpening filter to the input image to produce a background sharpened image; determine, using at least a high-contrast detector, a motion detector and one or more of the input image and previous images from the video stream, one or more masks that select stationary high-contrast regions of the input image, the stationary high-contrast regions including stationary text-regions when present in the input image; determine, using at least the one or more masks, a background mask that selects remaining regions of the input image different from respective regions of the input image selected by the one or more masks; apply the one or more masks to the high-contrast sharpened image to select the stationary high-contrast regions from the high-contrast sharpened image; apply the background mask to the background sharpened image to select the remaining regions from the background sharpened image; combine the stationary high-contrast regions from the high-contrast sharpened image and the remaining regions from the background sharpened image to produce a combined enhanced image; and control, using the communication interface, the at least one projector to project the combined enhanced image.

More detailed operation of the systems 200, 300, 400 implementing the method 100B is next described.

For example, starting with the system 200, and with reference to FIG. 2, the video frame 204 is received at the controller 220, up-sampled (e.g. via an up-sampling function) and provided (e.g. as up-sampled) to the high-contrast filter 226, the high-contrast detector 252, the motion detector 254, and background sharpening filter 228.

The high-contrast filter 226, and the background sharpening filter 228 respectively generate a high-contrast sharpened version of the up-sampled video frame 204 (e.g. at the block 154 of the method 100B), and a background sharpened version (e.g. at the block 156 of the method 100B) of the up-sampled video frame 204.

The high-contrast detector 252 and the motion detector 254 respectively generate (e.g. at the block 158 of the method 100B) a high-contrast mask and a motion mask, which are combined using the inverter 270 and the AND gate 271. For example, the motion mask is inverted by the inverter 270 (e.g. a "1" becomes "0" and vice versa) and provided to the AND gate 271 which combines the inverted motion mask with the high-contrast mask, resulting in a stationary high-contrast mask which selects stationary high-contrast regions of images, the stationary high-contrast regions including stationary text-regions. Put another way "ANDing" the inverted motion mask and the high-contrast mask removes motion regions from the high-contrast mask to determine (e.g. at the block 158 of the method 100B) the stationary high-contrast mask.

The output from the AND gate 271 is optionally smoothed by the mask smoothing function 264 which, for example smooths edges of the stationary high-contrast mask.

As depicted, the stationary high-contrast mask (e.g. the output from the AND gate 271 as optionally smoothed by the mask smoothing function 264) is provided to the background weighted map function 256 and to a multiplication function which multiplies the stationary high-contrast mask by "−1" (e.g. to change a "1" to a "−1") and sums the result with the unity matrix 257, which results in a "1" in the stationary high-contrast mask being changed to "0", and similarly results in a "0" in the stationary high-contrast mask being changed to a "1". The result of the operations of the background weighted map function 256 is to generate and/or determine (e.g. at the block 160 of the method 100B) a background mask which is complementary to the stationary high-contrast mask.

Hence, in these examples it is assumed that motion regions may be treated like background regions.

Furthermore, the background mask is already smoothed by way of the stationary high-contrast mask, used to produce the background mask, being already smoothed.

Returning to the output of the AND gate 271 (and/or the mask smoothing function 264), the stationary high-contrast mask is provided to the element-wise multiplier function 260-1 to select (e.g. at the block 162 of the method 100B) stationary high-contrast regions from the output of the high contrast filter 226 (e.g. the element-wise multiplier function 260-1 selects stationary high-contrast regions from the high-contrast sharpened version of the up-sampled video frame 204).

Similarly, and returning to the output of the background weighted map function 256, the background mask is provided to the element-wise multiplier function 260-2 to select (e.g. at the block 164 of the method 100B) background regions from the output of the background filter 228 (e.g. the element-wise multiplier function 260-2 selects background regions from the background sharpened version of the up-sampled video frame 204).

The stationary high-contrast regions (e.g. the output from the element-wise multiplier function 260-1), and the background regions (e.g. the output from the element-wise multiplier function 260-2) are used as input to a summation function which combines them (e.g. at the block 166 of the method 100B). For example, as the background mask is complementary to the stationary high-contrast mask, the stationary high-contrast regions are complementary to the background regions and the summation thereof results in a combined enhanced image with high-contrast sharpened regions and background sharpened regions, with edges therebetween smoothed using the mask smoothing function 264.

The projector 203 is controlled (e.g. at the block 168 of the method 100B) to project the combined enhanced image, for example by down-sampling via the down-sampling function to produce a down-sampled enhanced image, as well as using the shift function 262 to shift the combined enhanced image and down-sampling the shifted combined enhanced image via the down-sampling function to produce a shifted down-sampled enhanced image. The down-sampled enhanced image and the shifted down-sampled enhanced image are output to the projector 203 which projects the down-sampled enhanced image and the shifted down-sampled enhanced image, for example, consecutively and/or alternately.

It is further understood that the controller 220 performs the above described functionality for each video frame in a video stream.

Attention is next directed to the system 400 of FIG. 4 which has similar functionality as the system 200. However, in the system 400, the up-sampled video frame 204 is also provided to the motion filter sharpening 330, for example to generate a motion mask, edges of which are optionally smoothed via the smoothing motion-mask function 366. The motion mask (e.g. as smoothed), is used as input to the inverter 470, such that the AND gate 471 is used to combine the high-contrast mask of the high-contrast detector 252 with the motion mask, as described above, to generate a stationary high-contrast mask, as described above, which is optionally smoothed using the smoothing high-contrast function 364 (which may be similar to the mask smoothing function 264).

The motion mask (e.g. as smoothed) is further summed (e.g. via a summation function) with the high-contrast mask (e.g. as smoothed) and the summed mask is provided to the background weighted map function 256. The summed mask, if applied to an image, selects both stationary high-contrast regions and motion regions. Hence, in further contrast to the system 200, the background mask produced by the background weighted map function 256, in the system 400, selects background regions which do not include stationary high-contrast regions and motion regions. Put another way, the background mask produced by the background weighted map function 256, in the system 400 is complementary to a summation of the motion mask (e.g. as smoothed) and the high-contrast mask (e.g. as smoothed).

Hence, in the system of FIG. 4, the stationary high-contrast mask (e.g. as smoothed) is used by the element-wise multiplier function 260-1 to select sharpened stationary high contrast regions from the high-contrast filtered version of the up-sampled video frame 204, as generated by the high-contrast filter 226; the background mask (e.g. which is already smoothed by way of the stationary high-contrast mask and the motion masks, used to produce the background mask, being already smoothed) is used by the element-wise multiplier function 260-2 to select sharpened background regions from the background-filtered version of the up-sampled video frame 204, as generated by the background filter 228; and the motion mask (e.g. as smoothed) is used by the element-wise multiplier function 260-3 to select sharpened motion regions from the motion-filtered version of the up-sampled video frame 204, as generated by the motion sharpening filter 330.

Furthermore, the three sharpened region types (e.g. the sharpened stationary high contrast regions, the sharpened background regions and the sharpened motion regions) are generally, together, complementary in that sharpened stationary high contrast regions are different from the sharpened background regions and the sharpened motion regions, etc. Hence, summing the three sharpened regions types via the summation function, prior to the down-sampling and shifted down-sampling, results in a combined enhanced image with three sharpened regions types.

Hence, as has been described, in the systems 200, 400, the one or more masks that are generated (e.g. at the block 158 of the method 100B) include a single stationary high-contrast mask that selects only the stationary high-contrast regions of an input image (e.g. the video frame 204 and/or an up-sampled version thereof), the single stationary high-contrast mask determined using both the high-contrast detector 252 and the motion detector 254

The functionality of the system 300 is similar to the system 400. However, the output of the high-contrast detector 252 (e.g. a high-contrast mask) is not combined with the output of the high-contrast detector 252 (e.g. a motion mask). Hence, when the video frame 204 includes moving high-contrast regions, there may be overlaps between the contrast mask and the motion mask.

To resolve such overlaps, the high-contrast mask the motion mask may be generated using a weighting scheme.

While details of the weighting scheme are described in more detail below, functionality of the weighting scheme of the system 300 may be summarized as follows, with the term "image" being used interchangeably with the term "video frame".

Firstly, with brief reference to the block 158 of the method 100B, in the system 300, the one or more masks include: a high-contrast mask that selects high-contrast regions of an input image, the high-contrast mask determined using the high-contrast detector 252; and a motion mask that selects moving regions, the motion mask determined using the motion detector 254. Further, as has already been described, in the system 300, the motion sharpening filter 330 is applied to an input image (e.g. the up-sampled video frame 204) to produce a motion sharpened image.

The controller 320 generally determines respective weights to determine a contribution of each of the high-contrast mask and the motion mask to respective regions of the input image corresponding to static high-contrast regions and moving regions.

The controller 320 applies the respective weights to the high-contrast mask and the motion mask to generate: a weighted high-contrast mask that includes higher weights for the static high-contrast regions of the input image than for other regions of the input image; and a weighted motion mask that includes respective higher weights to moving regions of the input image respective other regions of the input image.

In general, respective weights for any given pixel of both the weighted high-contrast and the weighted motion mask are normalized.

Furthermore, the weighted high-contrast mask and the weighted motion mask may be used to generate the background mask via the background weighted map function 256.

The controller 320 applies the background mask to the background sharpened image to select the remaining regions from the background sharpened image by: applying the background mask to the background sharpened image to select weighted background regions from the background sharpened image. The term "weighted background regions" is relative to the weighted high-contrast regions and the weighted motion regions.

The controller 320 applies (e.g. at the block 162 of the method 100B) the one or more masks to the high-contrast sharpened image to select the stationary high-contrast regions from the high-contrast sharpened image by: applying the weighted high-contrast mask to the high-contrast sharpened image to select weighted stationary high-contrast regions from the high-contrast sharpened image; and applying the weighted motion mask to the motion sharpened image to select weighted motion regions from the motion sharpened image.

As has been described herein, the background mask may comprise a weighted background mask which may be determined using the weighted high-contrast mask and the weighted motion mask.

Furthermore, the controller 320 combines (e.g. at the block 166 of the method 100B) the stationary high-contrast regions from the high-contrast sharpened image and the remaining regions from the background sharpened image to produce a combined enhanced image by: combining the weighted stationary high-contrast regions, the weighted motion regions and the weighted background regions to produce the combined image, which is output to the projector 303 (e.g. after been down-sampled, and shifted and down-sampled).

Hence, in the system 300, the high-contrast detector 252 and the motion detector 254 are adapted to implement such a weighting scheme, which is described in more detail below.

Aspects of the functionality of the devices 201, 301, 401 of FIG. 2, FIG. 3 and/or FIG. 4 are described in yet further detail hereafter.

Content Detection

Figure 5:
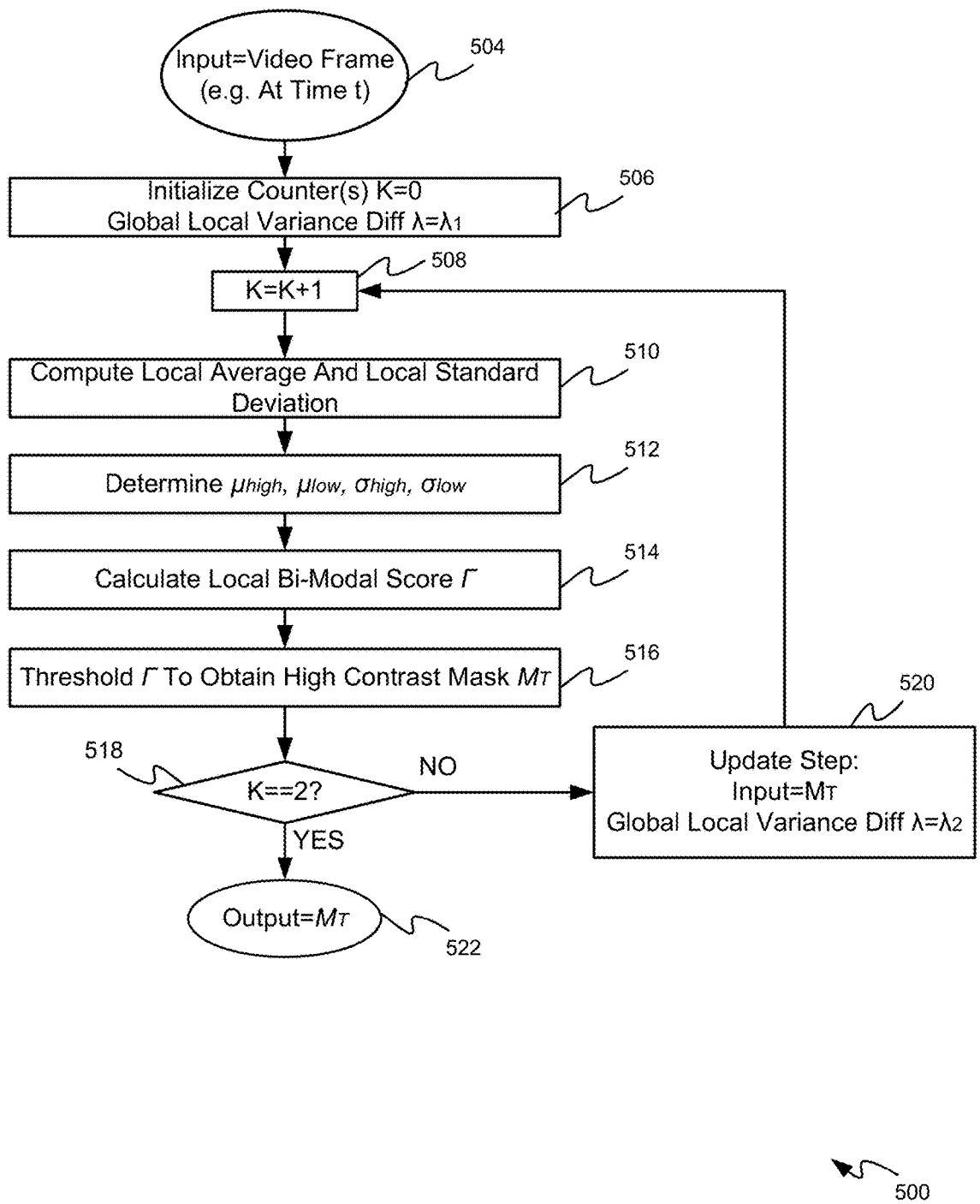
FIG. 5 depicts a method to generate a high-contrast mask, also called the high-contrast detection method, according to non-limiting examples.
Figure 8:
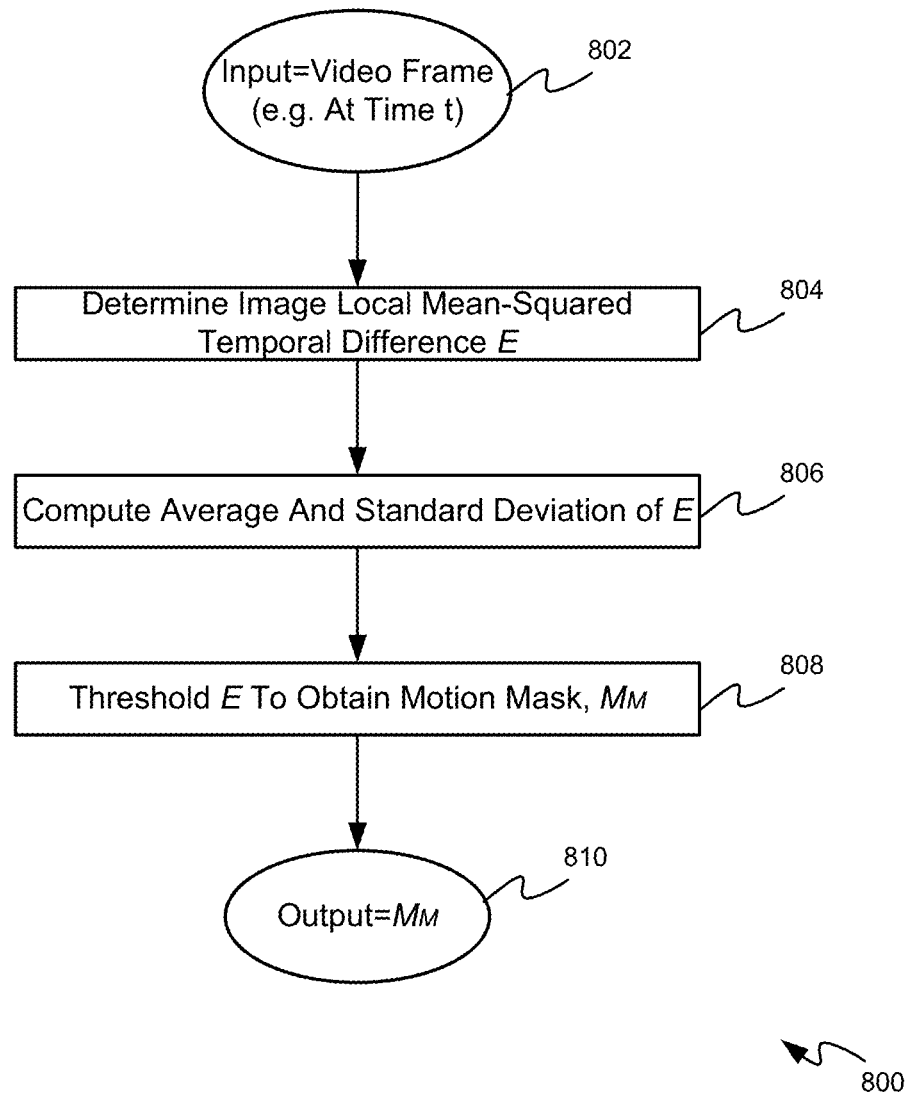
FIG. 8 depicts a method to generate a motion mask, also called the motion detection method, according to non-limiting examples.

In the present specification, due to the different features of different contents in the video frames, each video frame may be enhanced differently based on respective high-contrast or text masks, motion masks and/or background masks. Methods of generating a high-contrast and/or text mask, and a motion mask are shown in FIG. 5 and FIG. 8, respectively. A method 500 of FIG. 5 is next described, with the method of FIG. 8 described below.

High-Contrast Regions Detection:

Attention is next directed to FIG. 5 which depicts a method 500 to generate a high-contrast mask which may be used in the high contrast detector 252, according to non-limiting examples. It is understood that the method 500 may be implemented in any of the systems 200, 300, 400 and, in particular, by the controllers 220, 320, 420 of the devices 201, 301, 401. In particular, the method 500 may be implemented via the controllers 220, 320, 420 implementing a respective application 299, 399, 499. The method 500 may be implemented on variations of the systems 200, 300, 400 as well. Furthermore, the method 500 need not be performed in the exact sequence as shown and likewise various blocks may be performed in parallel rather than in sequence. Accordingly, the components of the method 500 are referred to herein as "blocks" rather than "steps."

At a block 504, a controller and/or device receives a video frame, for example at a time "t", such as the video frame 204.

At a block 506, the controller and/or the device initializes an iteration counter "K" at zero (e.g. K=0), the counter "K" for counting and/or controlling iterations of generating a high-contrast mask; at the block 506, the controller and/or the device further sets a global local variance difference $\lambda$ to a first value of $\lambda_1$. As will be described in more detail below, global local variance difference $\lambda$ comprises a constant obtained empirically for a given type of input color channel or other type of features such as an image mask.

At a block 508, the controller and/or the device increments the counter "K" by "1" indicating that a first iteration of a high-contrast mask is to be generated.

At a block 510, the controller and/or the device, in order to test the bimodality of pixels in the video frame, for example of regions and/or patches of pixels in the video frame as defined by a matrix 1 of size $N_1 \times N_2$, determines an average, $\mu$, and a standard deviation, $\sigma$, of $\hat{N}_1 \times \hat{N}_2$ neighborhood pixels around the various pixels of the video frame, as described in more detail below.

Similarly, at a block 512, the controller and/or the device determines respective averages, $\mu_{high}$, $\mu_{low}$ and the standard deviations, $\sigma_{high}$, $\sigma_{low}$ are determined for groups of high contrast pixels and groups of low contrast pixels around the various pixels of the video frame, also described in more detail below.

At a block 514, the controller and/or the device determines a local bi-modal score $\Gamma$ for the various pixels of the video frame.

At a block 516, the controller and/or the device applies a threshold to the local bi-modal score $\Gamma$ to populate a values of a high contrast mask $M_T$.

At a block 518, the controller and/or the device determines whether "K" is equal to "2". In particular, the value of "K" tested at the block 518 may comprise a number of iterations used to generate the high-contrast mask. For example, as depicted the value of "K" tested at the block 518 is "2", hence, as depicted two iterations are used to generate the high-contrast mask.

For example, in the first iteration, at the block 518, K is equal to "1", as initially set at the blocks 506, 508; hence after the first iteration, when K is equal to not equal to 2 (e.g. a "NO" decision at the block 518), at a block 520, the controller and/or the device carries forward the high contrast mask MT determined at the block 516, as input to a second iteration of the blocks 508, 510, 512, 514, 516, such that in the second iteration the high contrast mask MT generated in the first iteration is used as a starting point for again generating the high contrast mask MT. For example, also at the block 520, the controller and/or the device sets the global local variance difference to a second value $\lambda_2$, where the second value $\mu_2$ of the global local variance difference is chosen to select sparse high-contrast features as compared to the first value $\lambda_1$ In particular, as will be described in more detail below, values for the variance difference $\lambda$ may be empirically chosen for noise rejection, for example, for when regions and/or patches of pixels in a video frame are evaluated for inclusion in the high contrast mask: the first value $\lambda_1$ may be chosen such that patches that are strongly bimodal are included in the high contrast mask, and the second value $\lambda_2$ may be chosen so only definitively "sparse" bimodal regions are included in the high contrast mask; "sparse" bimodal regions and/or high-contrast features are described in more detail below.

The block 508 is repeated such that K" is equal to "2", and the blocks 510, 512, 514, 516 to again generate the high contrast mask $M_T$.

After the second iteration of the block 516, at the block 518 a "YES" decision occurs (e.g. as K is equal to "2"), and, at a block 522, the controller and/or the device, outputs the high contrast mask MT for use, for example use by the controller and/or the device in implementing the method 100A and/or the method 100B.

However, in some examples, at the block 518, the value of "K" tested at the block 518 may be as low as "1" (e.g. only one iteration of the method 500 may be used to generate a high contrast mask), while in other examples, at the block 518, the value of "K" tested at the block 518 may be higher than "2" (e.g. more than two iterations of the method 500 may be used to generate a high contrast mask). In examples where the value of "K" tested at the block 518 is higher than "2", the global local variance difference $\lambda$ may be set to any suitable value at the block 520. For example as described above, and in further detail below, two cycles of a bimodal test may occur when K is set to "2": a first test (e.g. when K=1) to determine bimodal and/or high-contrast features that are close together (e.g. text-like features, but which may include parallel lines, and the like) to include in the first iteration of the high-contrast mask; and a second time (e.g. when K=2) to attempt to ensure that only "sparse" bimodal and/or high-contrast features are included in the second iteration of the high-contrast mask. For example, the second value $\lambda_2$ may be selected such that, in the second iteration, text is in included in the high-contrast mask, but areas of fine parallel lines are not included in the high-contrast mask. Such an approach may be used as, while enhanced sharpening may benefit "sparse" bimodal and/or high-contrast features, such enhanced sharpening may introduce artifacts when applied to larger, uniform high-contrast features (e.g. such as fine parallel lines). Hence, the term "sparse" bimodal and/or high-contrast features may refer to text and/or high-contrast features located in regions of a first size and/or of a first resolution, but exclude high-contrast features located in regions of a second size and/or of a second resolution, where the second size is larger than the first size and/or the second resolution is higher than the first resolution. Indeed, "sparse" bimodal and/or high-contrast features may exclude high-contrast features of a given resolution between lighter and darker areas over areas of a size, as may occur with fine parallel lines, and may be determined heuristically via trial and error in selecting the first value $\lambda_1$ and the second value $\lambda_2$. Indeed, "sparse" bimodal and/or high-contrast features may further be understood to include text-like features and/or features similar to a hand-drawn technical drawing, and excludes patterns to of "fine" lines, and/or "very fine" repeating patterns as often used in computer drawings; while the terms "fine" and "very fine" are relative they may be understood to mean alternating light and dark lines of a given resolution which, again may be determined heuristically via trial and error in selecting the first value $\lambda_1$ and the second value $\lambda_2$.

Further details of the method 500 will next be described.

High-contrast regions in images, such as text, fine textures, sparse and text-like regions, can be enhanced to emphasize their features. The high-contrast regions may be assumed to behave in a bimodal manner. In order to test the bimodality of the $i^{th}$ pixel in a given image or color channel, 1 of size $N_1 \times N_2$, an average, $\mu$, and the standard deviation, $\sigma$, of the $\hat{N}_1 \times \hat{N}_2$ neighborhood pixels around the $i^{th}$ location is obtained as follows (e.g. at the block 510 of the method 500):

$$\mu(i) = \sum_{j \in \aleph_i} \frac{I(j)}{|\aleph_i|}, \quad \text{(Equation 1)}$$

$$\sigma(i) = \sqrt{\sum_{j \in \aleph_i} \frac{1}{|\aleph_i| - 1}(I(j) - \mu(i))^2}$$

where i is a pixel index, e.g. $i=[(1,1), (1,2), \ldots, (N_1, N_2)]$, $N_1$ and $N_2$ are the number of rows and columns of a video frame and/or image I, $\hat{N}_1$ and $\hat{N}_2$ are the number of rows and columns of the local neighborhood $\aleph_i$, and $|\aleph_i|$ is the cardinality of the set Then, the value of the average μ(i) corresponding to the $i^{th}$ location is compared to the values of the neighborhood pixels at this location to categorize them into a low group (e.g. which may also be referred to as a low value region), $\aleph_i^-$, when a pixel value is less than μ(i) or high group (e.g. which may also be referred to as a high value region), $\aleph_i^+$, otherwise. Next, the pixel values of the high and low groups (e.g. high value regions and low value regions) are used to compute the average and standard deviation of each group (e.g. at the block 512 of the method 500) as follows:

$$\mu_{high}(i) = \sum_{j \in \aleph_i^+} \frac{I(j)}{|\aleph_i^+|}, \text{ and} \qquad \text{(Equation 2)}$$

$$\sigma_{high}(i) = \sqrt{\sum_{j \in \aleph_i^+} \frac{1}{|\aleph_i^+| - 1}(I(j) - \mu_{high}(i))^2}$$

$$\mu_{low}(i) = \sum_{j \in \aleph_i^-} \frac{I(j)}{|\aleph_i^-|}, \text{ and} \qquad \text{(Equation 3)}$$

$$\sigma_{low}(i) = \sqrt{\sum_{j \in \aleph_i^-} \frac{1}{|\aleph_i^-| - 1}(I(j) - \mu_{low}(i))^2}$$

For a pixel to be classified as a high-contrast, its variance σ(i) given by Equation (1) should be much larger (e.g. as defined empirically) than the average of the corresponding $\sigma_{high}(i)$ and $\sigma_{low}(i)$ given by Equation (2) and Equation (3), respectively. Otherwise, the pixel would be considered as belonging to the non-high-contrast class. This test may be referred to as a bimodal test. To perform this bimodal test, a local threshold (e.g. a standard deviation difference) can be obtained (e.g. at the block 514 of the method 500) for a pixel as:

$$\Gamma(i) = (\sigma(i) - \lambda) - \left(\frac{\sigma_{high}(i) + \sigma_{low}(i)}{2}\right) \qquad \text{(Equation 4)}$$

where i is a pixel index and λ (e.g. the global local variance difference referred to with respect to blocks 506, 520 of the method 500) is a constant obtained empirically for a given type of input color channel or other type of features such as image mask. λ may be any suitable value which may be selected heuristically, as described above. The mask of the high-contrast regions, $M_T$, is obtained (e.g. at the block 516 of the method 500) based on the threshold Γ as:

$$M_T(i) = \begin{cases} 1, & \Gamma(i) > 0 \\ 0, & \text{Otherwise} \end{cases} \qquad \text{(Equation 5)}$$

The blocks of the method 500, in which Equation 1 to Equation 5 are used, may be repeated (e.g. for K=2), while setting the video frame and/or input image to I=$M_T$ and using the appropriate λ (e.g. in the second iteration, the second value $\lambda_2$ is selected select sparse bimodal and/or high-contrast features, as compared to the first value $\lambda_1$) in Equation (4). The final high-contrast mask (e.g. at the block 522 of the method 500) is the output from Equation (5). This second iteration may be used to ensure only sparse features are included in the high-contrast mask.

In particular, the method 500 and/or the high contrast mask output at the block 522 of the method 500 may be used in the high contrast detector 252 to detect high contrast regions of the video frame 204.

Hence, with reference to the method 500, and Equation 1 to Equation 5, the high contrast detector 252 may be based on determining (e.g. at the block 510 of the method 500 and Equation 1): an average and a standard deviation of pixel values of a region of pixels of an input image around a given pixel; high value regions of the region having respective pixel values above the average; and low value regions of the region having respective pixel values below the average; determining (e.g. at the block 512 of the method 500, Equation 2, Equation 3 and Equation 4) a standard deviation difference (e.g. Γ(i) of Equation 4) between the standard deviation of the region and an average of respective standard deviations of each of the high value regions and the low value regions for the pixels of the input image to determine an intermediate mask (e.g. the high contrast mask MT determined during the first iteration of the method 500 at the blocks 514, 516, and using Equation 4 and Equation 5) comprising: non-zero value pixels corresponding to the pixels of the input image having a respective standard deviation difference greater than zero; and zero value pixels corresponding to the pixels of the input image having a respective standard deviation difference less than or equal to zero; and repeating (e.g. at the second iteration of the method 500) determining the average, the standard deviation, the high value regions, the low value regions, and the standard deviation difference for respective pixels of the intermediate mask to determine a high-contrast mask that selects one or more of the high-contrast regions and the text regions of the input image.

In particular, determining the standard deviation difference between the standard deviation of the region and the average of respective standard deviations of each of the high value regions and the low value regions for the pixels of the input image to determine the intermediate mask includes: determining the standard deviation difference between the standard deviation of the region within an additive constant (e.g. the constant λ in Equation 5) and the average of respective standard deviations of each of the high value regions and the low value regions for the pixels of the input image (e.g. as shown in Equation 5).

Figure 6:
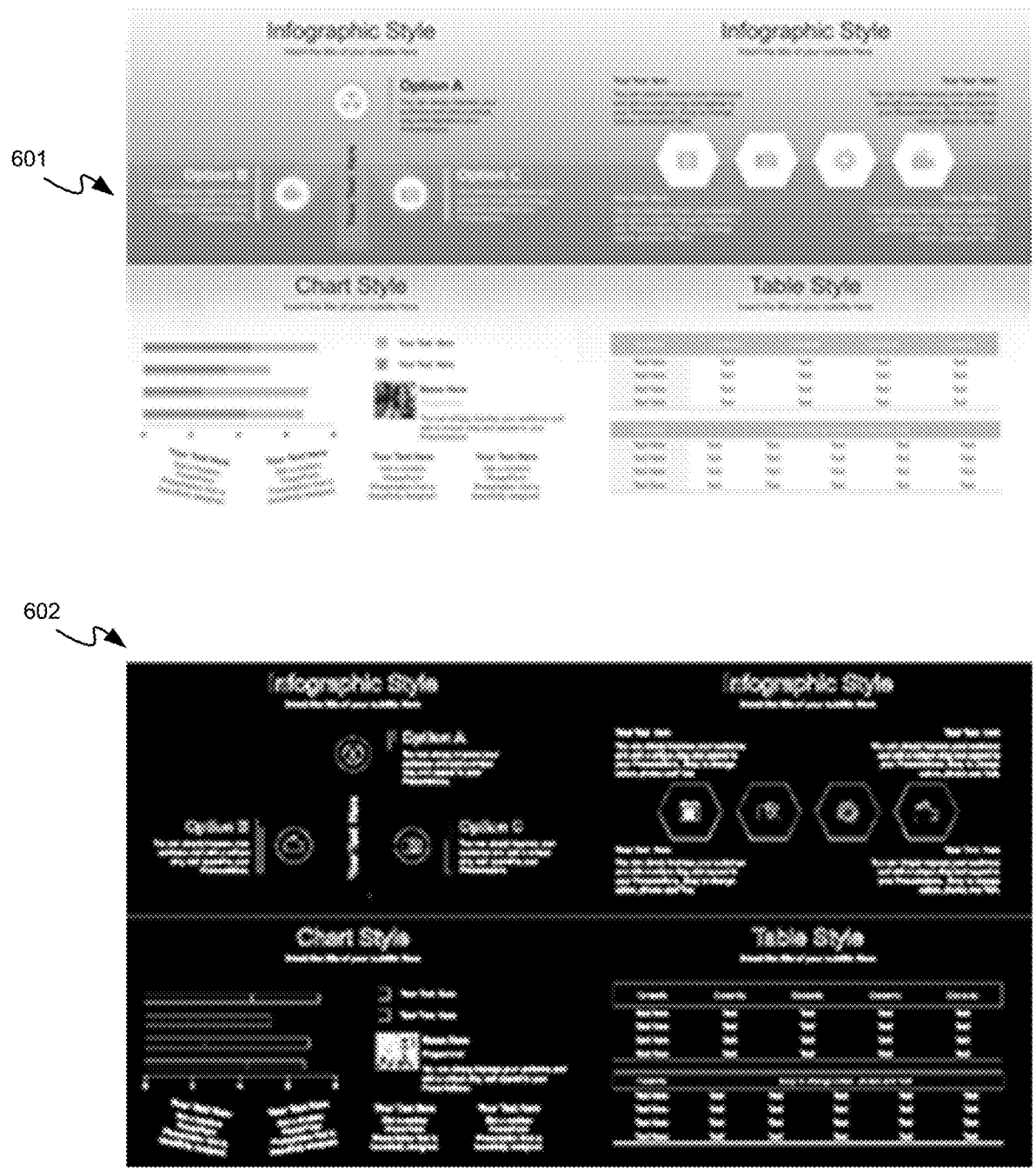
FIG. 6 depicts a sample image and a corresponding high-contrast mask generated using the high-contrast detection method of FIG. 5, according to non-limiting examples.

A sample image 601 and its corresponding high-contrast mask 602 generated using the high-contrast detection method 500 are shown in FIG. 6. In particular, text regions, and other high contrast regions, of the sample image 601 are converted to white regions in the mask 602, and low contrast regions of the sample image 601 are converted to black regions in the mask 602. In particular, the mask 602 represents a mask that may be generated using only one iteration of the method 500 (e.g. when the value of "K" tested at the block 518 is "1").

Figure 7:
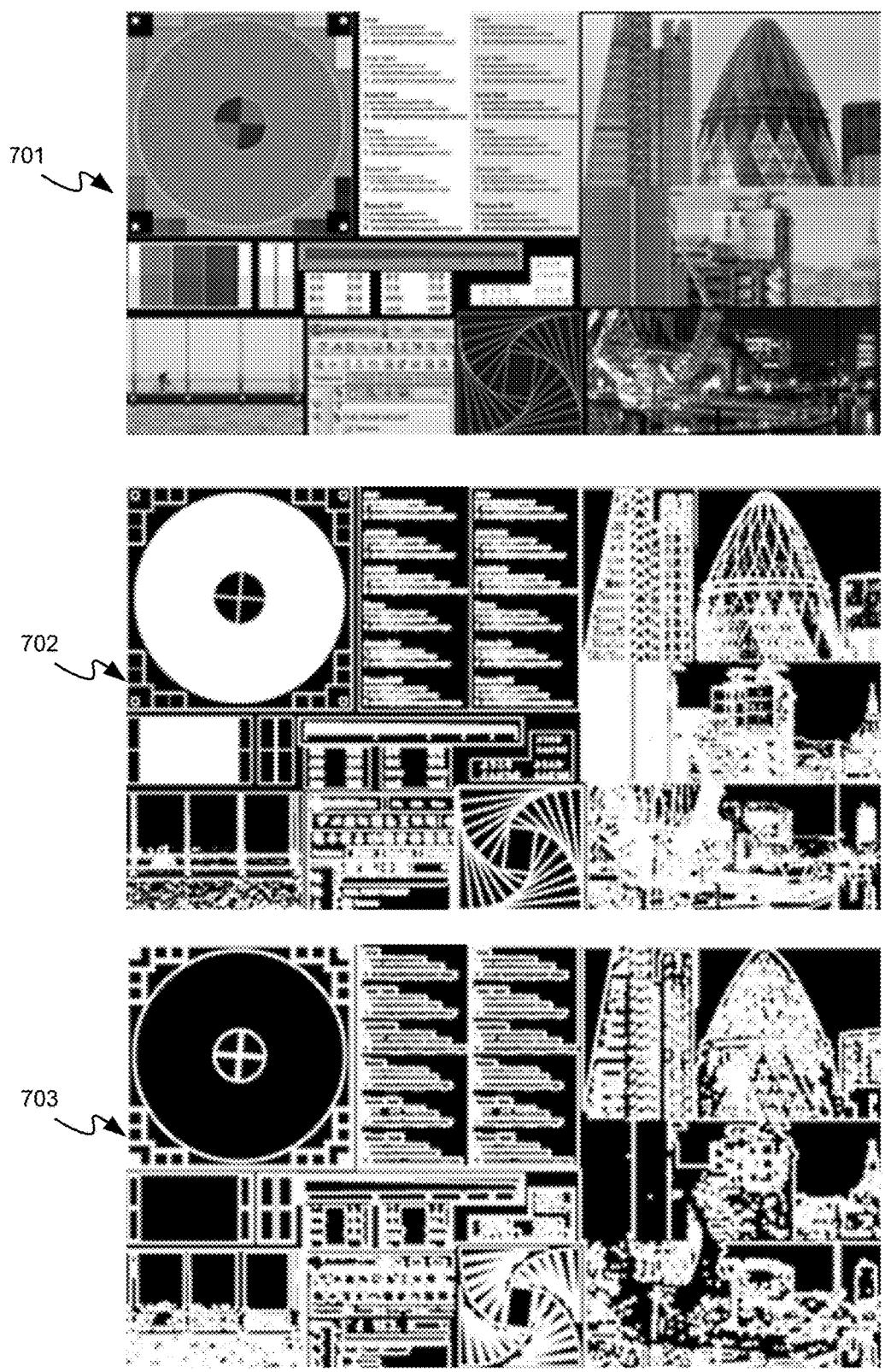
FIG. 7 depicts another sample image, an intermediate mask, and a corresponding high-contrast mask generated using the high-contrast detection method of FIG. 5, according to non-limiting examples.

Attention is also directed to FIG. 7 which depicts: an image 701 which includes high contrast regions, such as a radial test pattern in the upper left corner. After Equations (2) to (5) are applied a first time and/or in a first iteration to the image 701, the high-contrast mask 702 results. During the first iteration, with a global local variance difference $\lambda_1$ is selected such that bimodal high-contrast regions which include sparse text and/or text-like regions, and non-sparse and/or non-text-like regions (and/or high-contrast and non-high-contrast) are set to white (e.g. "1") in the mask 702, including the radial test pattern (e.g. a non-sparse and/or non-text-like region) in the upper left corner. However, the radial test pattern is clearly not text and/or does not include sparse high-contrast features, as is characteristic of text. Hence, to better select sparse high-contrast regions and/or text, the Equations (2) to (5) are applied a second time to the mask 702, with a global local variance difference $\lambda_2$ selected to produce a final high-contrast mask 703 in which most non-text or non-high-contrast regions are set to black (e.g. "0") though regions with fine text-like features are also captured in the high-contrast or text mask 703. In particular, the mask 702 represents a mask that may be generated using only one iteration of the method 500 (e.g. when the value of "K" tested at the block 518 is "1"), while the mask 802 represents a mask that may be generated using two iterations of the method 500 (e.g. when the value of "K" tested at the block 518 is "2").

Figure 9:
FIG. 9 depicts a sample image and a corresponding motion mask generated using the motion detection method of FIG. 8, according to non-limiting examples.
Figure 9:

Motion Regions Detection:

Over-sharpening moving objects may result in flickering motion artifacts, which the human eye system may find intolerable (e.g. the human eye system is more tolerable to smooth motion). Thus, in the present specification, the moving contents are enhanced differently by the content-adaptive enhancing mechanism. The moving contents with high frequency and fine-grained characteristics may be detected by a motion-region detection method shown in FIG. 8, and a sample image 901 and sample motion mask 902 generated by this method is shown in FIG. 9.

For example, attention is next directed to FIG. 8 which depicts a method 800 to generate a motion mask which may be used in the motion detector 254, according to non-limiting examples. It is understood that the method 800 may be implemented in the systems 200, 300, 400 and, in particular, by the respective controllers 220, 320, 420 of the devices 201, 301 401. In particular, the method 800 may be implemented via the controllers 220, 320, 420 implementing a respective application 299, 399, 499. The method 800 may be implemented on variations of the systems 200, 300, 400 as well. Furthermore, the method 800 need not be performed in the exact sequence as shown and likewise various blocks may be performed in parallel rather than in sequence. Accordingly, the components of the method 800 are referred to herein as "blocks" rather than "steps."

At a block 802, a controller and/or a device receives a video frame, for example at a time "t", such as the video frame 204.

At a block 804, the controller and/or the device determines an image local-mean squared temporal difference "E", as described in more detail below.

At a block 806, controller and/or the device computes and/or determines an average and standard deviation of the image local-mean squared temporal difference "E", as described in more detail below.

At a block 808, the controller and/or the device thresholds the image local-mean squared temporal difference "E" to obtain a motion mask $M_M$, as described in more detail below.

At a block 810, the controller and/or the device outputs the motion mask $M_M$, as described in more detail below.

The method 800 will next be described in more detail.

In particular, a pixel value difference of a moving pixel between two input images is generally larger than the majority of the changes within the input images. For example, $I_t$ and $I_{t-1}$ may refer to two input images at time t and t–1, respectively; in particular, an input image $I_t$ may comprise an input image (e.g. and/or a video frame) of the video stream, at a time t, an input image $I_{t-1}$ (e.g. and/or a video frame) may comprise a previous image of the video stream at a time t–1. Put another way, the image $I_{t-1}$ generally precedes (and/or temporally precedes) the image $I_t$ in a video stream. The local mean-squared temporal difference, $E_t(i)$, between the images $I_t$, $I_{t-1}$, at time t and location i may be obtained (e.g. at the block 804 of the method 800) using:

$$E_t(i) = \sum_{j \in \aleph} \frac{1}{|\aleph_i|} (I_t(j) - I_{t-1}(j))^2 \qquad \text{(Equation 6)}$$

where $\aleph_i$ is the spatial neighbourhood around the $i^{th}$ pixel. The local mean-squared temporal difference indicates the average temporal changes at every pixel. Put another way, corresponding regions of the images $I_t$, $I_{t-1}$, are compared to determine temporal differences therebetween. In order to compute a threshold for $E_t$, the average $\mu_t$ and standard deviation values $\sigma_t$ of $E_t$ may be obtained (e.g. at the block 806 of the method 800), as follows:

$$\mu_t = \sum_{i=[(1,1),(1,2),\ldots,(N_1,N_2)]} \frac{1}{N_1 N_2} E_t(i), \text{ and} \qquad \text{(Equations 7)}$$

$$\sigma_t = \sqrt{\frac{1}{N_1 N_2 - 1} \sum_{i=[(1,1),(1,2),(N_1,N_2)]} (E_t(i) - \mu_t)^2}$$

The $i^{th}$ pixel may classified as belonging to a motion region when the changes in $E_t(i)$ are larger than the majority of the changes within the input images under consideration. This can be realized by using $\mu_t + \sigma_t + \beta$ as a threshold value for $E_t$, where $\beta$ is a factor calculated empirically. This condition allows filtering noisy static regions from being considered moving ones. The final motion mask $M_M$ may be obtained (e.g. at the block 808 of the method 800) using:

$$M_M(i) = \begin{cases} 1, E_t(i) > (\gamma \mu_t + \eta \sigma_t + \beta) \\ 0, \text{Otherwise} \end{cases} \qquad \text{(Equations 8)}$$

where $i=[(1,1), (1,2), \ldots, (N_1, N_2)]$, and $\gamma$, $\eta$ and $\beta$ are constant factors that can be calculated empirically. Hence, the Equations (8) may be used to threshold (e.g. at the block 808 of the method 800) the local mean-squared temporal difference, $E_t(i)$, to obtain the motion mask $M_M$.

Put another way, the motion detector 254 may be based on determining temporal differences (e.g. the temporal difference, $E_t(i)$) between a region of an input image (e.g. image $I_t$) of a video stream and a corresponding region of a previous image (e.g. image $I_{t-1}$) of the video stream.

Hence, for example, in FIG. 9, it is understood that the woman in the image 901 is moving, but text (e.g. "This is text") and a background are not moving. As such, applying the blocks of the method 800 to the image 901 results in pixels corresponding to the woman being white (e.g. "1") and pixels corresponding to text and/or background being black (e.g. "0").

Non-Stationary Filtering:

Since regions of images and/or video frames with different contents are generally enhanced differently, as described herein, there may be a sharp boundary between different contents especially when the moving and high-contrast regions are adjacent. Most existing projector-camera systems do not enhance the resolution in a content-adaptive way, and may not be adapted to combine contents with different features. Hence, the present specification further provides a method to generate a final composite image by smoothly combining the different contents with different features, described hereafter. In particular, the following may be used to generate the smoothing functions 264, 364, 366.

Let G denote a set that is defined as G={T, M,Ω}, where T, M and Ω refer to high-contrast or text regions, motion regions and background regions, respectively. Given an original video frame and/or input image, I, three Wiener deconvolution filters $F_T$, $F_M$ and $F_\Omega$ with different sharpening parameters may be applied to I, accordingly, and the corresponding filtered sharpened images $I_T$, $I_M$ and $I_\Omega$ may be calculated as:

$$I_k = I * F_k \text{ for all } k \in G \quad \text{(Equation 9)}$$

where * denotes a spatial convolution operation.

Next, given the three filtered images $I_T$, $I_M$, and $I_\Omega$, (e.g. $I_T$ may comprise the high-contrast sharpened image of the block 154 of the method 100B, $I_\Omega$ may comprise the background sharpened image of the block 154 of the method 100B, while $I_M$ may comprise a motion sharpened image) a composite image may be computed as follows. The goal is to find a set of local weights $\overline{\alpha}_T$, $\overline{\alpha}_M$ and $\overline{\alpha}_\Omega$ corresponding to the more-sharpened high-contrast regions in $I_T$, the less-sharpened motion in $I_M$, and enhanced background in $I_\Omega$ to obtain the enhanced composite image $\hat{I}$ as:

$$\hat{I}(i, t) = \sum_{k \in G} \overline{\alpha}_k(i, t) \circ I_k(i, t) \quad \text{(Equation 10)}$$

where $$\overline{\alpha}_k(i, t) = \frac{\alpha_k(i, t)}{\sum_{g \in G \setminus \{\Omega\}} \alpha_g(i, t)} \ni \sum_{k \in G} \overline{\alpha}_k(i, t) = 1 \quad \text{(Equation 11)}$$

and i=[(1,1), (1,2), . . . , (N₁, N₂)], t is the frame number, $\overline{\alpha}_T$, $\overline{\alpha}_M$ and $\overline{\alpha}_\Omega$ are the normalized smoothed masks that correspond to the sharpened images $I_T$, $I_M$ and $I_\Omega$, and ∘ is the element-wise multiplication. In order to obtain the factors $\alpha_T$, $\alpha_M$ and $\alpha_\Omega$ in (Equations 11), normalized penalty weights $\overline{\omega}_k(i,j,t,l), k \in G$, may be used as smoothing kernels spatially and temporally, and they can be computed as (for the system 300 of FIG. 3, e.g. more generally):

$$\overline{\omega}_k(i, j, t, l) = \quad \text{(Equations 12A)}$$

$$\begin{cases} \dfrac{\omega_T(i, j)}{\sum_{n \in \aleph_i} \omega_T(i, n)} & \text{if } k = T \text{ (TEXT)} \\ \dfrac{\omega_M(i, j, t, l)}{\sum_{n \in \aleph_i} \sum_{n \in \aleph_t} \omega_M(i, n, t, u)} & \text{if } k = M \text{ (MOTION)} \end{cases}$$

or they can be computed as (for the system 400 of FIG. 4):

$$\overline{\omega}_k(i, j, t, l) = \quad \text{(Equations 13B)}$$

$$\begin{cases} \dfrac{\omega_T(i, j)}{\sum_{n \in \aleph_i} \omega_T(i, n)} & \text{if } k = T \text{ (STATIC TEXT)} \\ \dfrac{\omega_M(i, j, t, l)}{\sum_{n \in \aleph_i} \sum_{n \in \aleph_t} \omega_M(i, n, t, u)} & \text{if } k = M \text{ (MOTION)} \end{cases}$$

where (for both Equation 12A and 12B):

$$\omega_T(i, j) = \exp\left(-\frac{d_E^2(i, j)}{\sigma_{sp}^2}\right) \quad \text{(Equation 14)}$$

$$\omega_M(i, j, t, l) = \exp\left(-\frac{d_E^2(i, j)}{\sigma_{sp}^2} - \frac{d_{tmp}^2(i, j, t, l)}{\sigma_{tmp}^2}\right) \quad \text{(Equation 15)}$$

and $d_E(\bullet)$ is the Euclidean distance between pixels i and j (j ∈ $\aleph N_i$), and $d_{tmp}(\bullet)$ is the temporal distance between frames at times t and l (l ∈ $\aleph_t$), and $\sigma_{sp}$ and $\sigma_{tmp}$ being spatial and temporal control parameters that determine how much farther pixels/frames contribute, such that (for the systems 300, 400 of FIG. 3 and FIG. 4):

$$\sum_{l \in \aleph_t} \sum_{j \in \aleph_i} \overline{\omega}_k(i, j, t, l) = 1, \quad \text{(Equation 16)}$$

for each $k \in G \setminus \{\Omega\}$

The factors $\alpha_T$, $\alpha_M$ and $\alpha_\Omega$ in Equation (11) may be obtained as follows (using the respective weighting of determined from Equations 12A and 15 when using the system 300 of FIG. 3, or using the respective weighting of determined from Equations 12B and 15 when using the system 400 of FIG. 4):

$$\alpha_k(i, t) = \quad \text{(Equation 17)}$$

$$\begin{cases} \sum_{l=t} \sum_{j \in N_i} \overline{\omega}_k(i, j, t, l) M_k(i, j, t, l) & \text{if } k = T \text{ (TEXT or STATIC TEXT)} \\ \sum_{l \in N_c} \sum_{j \in N_i} \overline{\omega}_k(i, j, t, l) M_k(i, j, t, l) & \text{if } k = M \end{cases}$$

$$\alpha_\Omega = \Lambda - \sum_{k \in G \setminus \{\Omega\}} \alpha_k \ni \sum_{k \in G} \alpha_k(i, t) = 1 \quad \text{(Equation 18)}$$

and $\Lambda$ is the unit matrix. As shown in Equations (16), the computation of $\alpha_T$ is obtained by smoothing the high-contrast mask, $M_T$, using a spatial smoothing kernel, $\overline{\omega}_T$ (e.g. and which may comprise the smoothing function 364 and/or mask). For computing $\alpha_M$, the motion masks, $M_M$, within a temporal window, $\aleph_t$, may be smoothed spatially and temporally using a smoothing kernel $\overline{\omega}_M$ as shown in Equation (12) (e.g. and which may comprise the smoothing function 366 and/or mask). On the other hand, the computation of $\alpha_\Omega$ is computed by using Equation (17), which is a function in $\alpha_T$ and $\alpha_M$. These normalized smoothed masks $\overline{\alpha}_k$ for all k $\in$ G indicate how each pixel of a given frame contributes to the final composite image given by Equation (10).

Put another way, one or more smoothing functions 264, 364, 366 may be applied to one or more masks (e.g. the masks of the high contrast detector 252, the motion detector 254, and the like, as in the system 300) prior to determining a background mask (e.g. determined via the background weighting map function 256) and prior to applying the one or more masks to a high-contrast sharpened image to select stationary high-contrast regions from the high-contrast sharpened image, such that one or more smoothed masks are used to determine the background mask and select the stationary high-contrast regions from the high-contrast sharpened image.

In some examples, the processes described above may be implemented on a patchwise basis for input images; for example, a centered N×N-pixel patch may be "slid" over each pixel of an input image and the mean and standard deviation ($\sigma$) may be calculated for the patch, with standard deviations pixels in the N×N patch that are above the patch mean ($\sigma_{high}$) and also for those that are below the patch mean ($\sigma_{low}$) being determined as otherwise described above, and the high-contrast or text mask $M_T$ is determined for the patch. These steps may be performed a second time on the binary $M_T$, (although $\lambda$ may be set to a lower value as compared to $\lambda$ used in initially generating the high-contrast or text mask $M_T$), as otherwise described above, to generate a high-contrast mask that selects sparse features; for example, $\lambda$ may be reduced by one to several orders of magnitude in the second iteration as compared to the first iteration. The resulting $M_T$ may be dilated. With brief reference back to FIG. 6, the mask 602 in FIG. 6 shows an example of a mask $M_T$ generated using the patchwise method.

Motion may also be found on a patchwise basis of an input image using a current frame ($I_t$) and a previous frame ($I_{t-1}$). Again, a centered N×N-pixel patch may be "slid" over each pixel and calculate the sum of the square of the differences between $I_{t-1}$ and $I_t$, ie for each of the N×N pixels in the patch, subtract the value in $I_{t-1}$ from $I_t$, square the difference and then sum all the N×N values, to generate a "difference image" $E_t$, for example as in Equation (6). The threshold value of $\mu+\sigma$ is used so only the most abrupt changes in fine features may be flagged as 'in-motion pixels'. The algorithm also sets a minimum empirical threshold factor $\lambda$ for the static video case. Restating all the above, a stationary mask $M_S$ may calculated from:

$$M_s(i) = \begin{cases} 0, E_t(i) > (\mu(E_t) + \sigma(E_t) + \lambda)(\text{MOTION}) \\ 1, \text{Otherwise (STATIONARY)} \end{cases} \quad \text{(Equations 18)}$$

Where i=pixel index and, $\lambda$ is again heuristically determined. Such a stationary high-contrast mask $M_S(i)$ may be used at block 158 of the method 100B. Furthermore, the one or more masks of the block 158 of the method 100B may include a single stationary high-contrast mask (e.g. only the stationary high-contrast mask $M_S(i)$) that selects only the stationary high-contrast regions of an input image. In some examples, the single stationary high-contrast mask may be determined using both the high-contrast detector 252 and the motion detector 254, for example, using the inverter 270 and the AND gate 271

Figure 10:
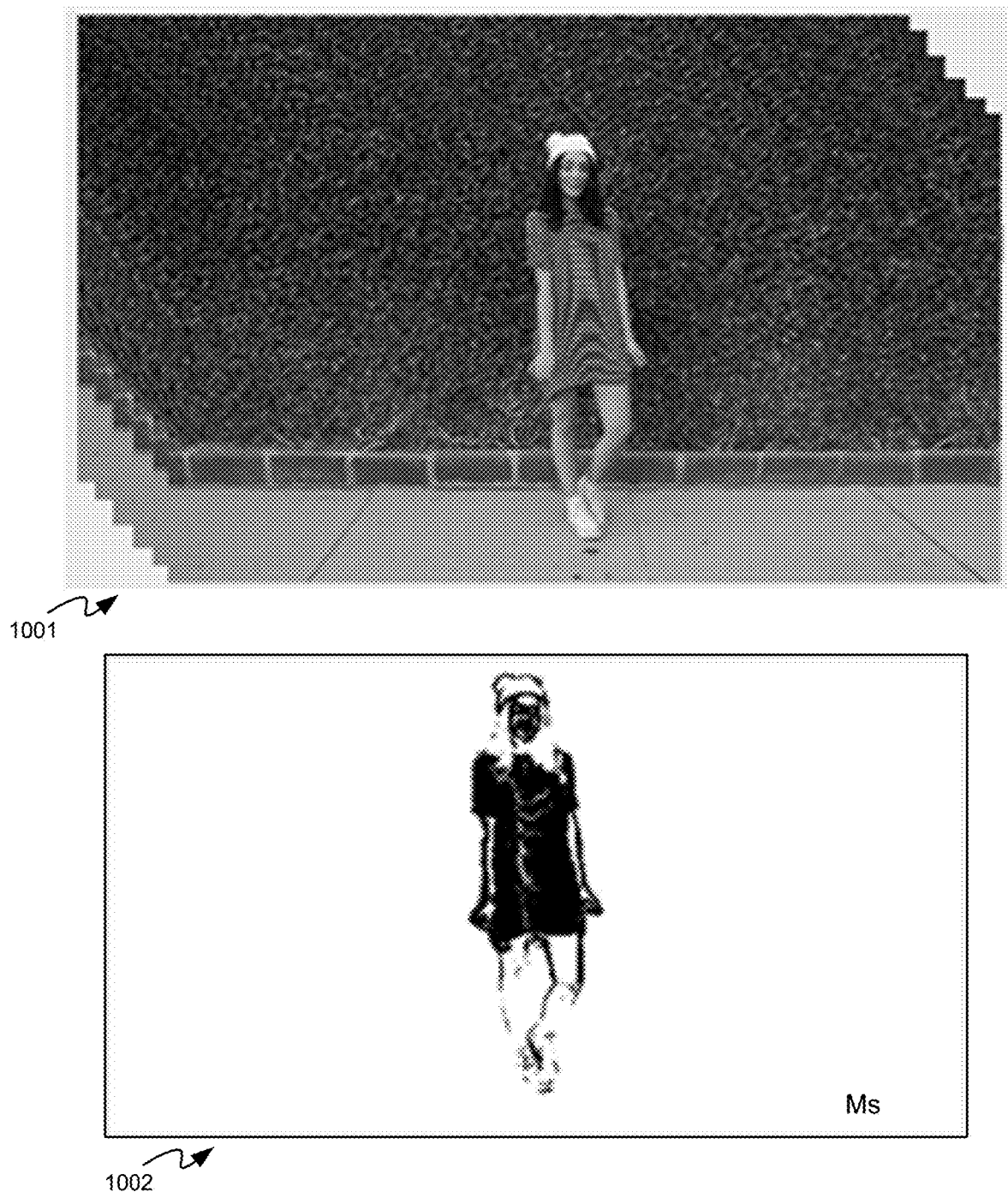
FIG. 10 depicts, in a top portion, frames from a sample video and stationary masks $M_S$, in a bottom portion, generated for such frames, according to non-limiting examples.

Frames 1001 from a sample video of a girl moving in front of a hedge and the stationary mask $M_S$ 1002 for it are shown in FIG. 10. In particular, in the frames 1001 it is understood that the woman is moving, but the background is not moving. Hence, in the mask 1002, pixels corresponding to the woman are black (e.g. "0") and pixels corresponding to the background are white (e.g. "1").

In other examples, pixel patch weighting and summation may be implemented by using a logical AND operation, such that the high-contrast or text $M_T$ and stationary $M_S$ masks may be "AND"-ed together to generate a stationary high-contrast mask (e.g. high-contrast/text AND stationary) $M_{TS}$, which may be blurred with a Guassian function and/or Gaussian kernel. The dilated-and-blurred stationary high-contrast or text mask $M_{TS}$ may be pixel-wise multiplied with the output of applying an Enhanced N×N Spatial Wiener Deconvolution. Similarly, for the background, 1 minus the dilated-and-blurred stationary high-contrast mask $M_{TS}$ may be pixel-wise multiplied with the output of applying the Default N×N Spatial Wiener Deconvolution ($K_d$). Each of these pixel-wise multiplications may be summed to get an enhanced combined image.

The devices, systems and methods described herein may be implemented in any suitable manner. For example input images may be images from video streams and may include, but are not limited to, an AVI file, a series of JPG files, a PNG file, and the like. Video streams may include, but are not limited to, High-Definition Multimedia Interface (HDMI) data, Digital Visual Interface (DVI) data, DisplayPort (DP) data, Video over Internet Protocol (IP) data, Video Graphics Array (VGA) data, and/or video transport data.

Projectors 203, 303, 403 described herein may include, but are not limited to one or more of a digital projector, a cinema projector, an LCOS (Liquid Crystal on Silicon) based projector, a DMD (digital micromirror device) based projector and the like. Furthermore, while only one projector is depicted in figures of the present specification, output may be to more than one projector.

Furthermore, as also depicted in FIG. 2, FIG. 3 and FIG. 4, sharpen-enhanced images may be output to the projector(s) 203, 303, 403 using shifted superposition (SS-POS) but any suitable process for outputting sharpen-enhanced images to the projector(s) is within the scope of the present specification. For example, downsampling occurs for sharpen-enhanced images as well as shifted sharpen-enhanced images and each are output to the projector(s) 203, 303, 403 for projection.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

We claim:

1. A device comprising:
a controller and a communication interface configured to communicate with at least one projector,
the controller having access to a memory storing: a high-contrast sharpening filter configured to sharpen high-contrast regions in images, the high-contrast regions including text regions when present in the images; and a background sharpening filter configured to sharpen other regions of the images different from the high-contrast regions, the background sharpening filter further configured to apply less sharpening to the images than the high-contrast sharpening filter;
the controller configured to:
receive an input image from a video stream;
apply the high-contrast sharpening filter to the input image to produce a high-contrast sharpened image;
apply the background sharpening filter to the input image to produce a background sharpened image;
determine, using at least a high-contrast detector, a motion detector and one or more of the input image and previous images from the video stream, one or more masks that select stationary high-contrast regions of the input image, the stationary high-contrast regions including stationary text-regions when present in the input image;
determine, using at least the one or more masks, a background mask that selects remaining regions of the input image different from respective regions of the input image selected by the one or more masks;
apply the one or more masks to the high-contrast sharpened image to select the stationary high-contrast regions from the high-contrast sharpened image;
apply the background mask to the background sharpened image to select the remaining regions from the background sharpened image;
combine the stationary high-contrast regions from the high-contrast sharpened image and the remaining regions from the background sharpened image to produce a combined enhanced image; and
control, using the communication interface, the at least one projector to project the combined enhanced image.

2. The device of claim 1, wherein the one or more masks include a single stationary high-contrast mask that selects only the stationary high-contrast regions of the input image, the single stationary high-contrast mask determined using both the high-contrast detector and the motion detector.

3. The device of claim 1, wherein the controller is further configured to: apply one or more smoothing functions to the one or more masks prior to determining the background mask and prior to applying the one or more masks to the high-contrast sharpened image to select the stationary high-contrast regions from the high-contrast sharpened image, such that one or more smoothed masks are used to determine the background mask and select the stationary high-contrast regions from the high-contrast sharpened image.

4. The device of claim 1, wherein the one or more masks include: a high-contrast mask that selects high-contrast regions of the input image, the high-contrast mask determined using the high-contrast detector; and a motion mask that selects moving regions, the motion mask determined using the motion detector, and the memory further stores a motion sharpening filter configured to sharpen motion in the images, the controller being further configured to:
apply the motion sharpening filter to the input image to produce a motion sharpened image;
determine respective weights to determine a contribution of each of the high-contrast mask and the motion mask to respective regions of the input image corresponding to static high-contrast regions and moving regions;
apply the respective weights to the high-contrast mask and the motion mask to generate: a weighted high-contrast mask that includes higher weights for the static high-contrast regions of the input image than for other regions of the input image; and a weighted motion mask that includes respective higher weights to moving regions of the input image respective other regions of the input image, wherein respective weights for any given pixel of both the weighted high-contrast and the weighted motion mask are normalized;
apply the background mask to the background sharpened image to select the remaining regions from the background sharpened image by: applying the background mask to the background sharpened image to select weighted background regions from the background sharpened image;

apply the one or more masks to the high-contrast sharpened image to select the stationary high-contrast regions from the high-contrast sharpened image by: applying the weighted high-contrast mask to the high-contrast sharpened image to select weighted stationary high-contrast regions from the high-contrast sharpened image; and applying the weighted motion mask to the motion sharpened image to select weighted motion regions from the motion sharpened image, wherein the background mask comprises a weighted background mask determined using the weighted high-contrast mask and the weighted motion mask; and combine the stationary high-contrast regions from the high-contrast sharpened image and the remaining regions from the background sharpened image to produce a combined enhanced image by: combining the weighted stationary high-contrast regions, the weighted motion regions and the weighted background regions to produce the combined image.

5. The device of claim 1, wherein the high-contrast detector is based on:
determining: an average and a standard deviation of pixel values of a region of pixels of the input image around a given pixel; high value regions of the region having respective pixel values above the average; and low value regions of the region having respective pixel values below the average;
determining a standard deviation difference between the standard deviation of the region and an average of respective standard deviations of each of the high value regions and the low value regions for the pixels of the input image to determine an intermediate mask comprising: non-zero value pixels corresponding to the pixels of the input image having a respective standard deviation difference greater than zero; and zero value pixels corresponding to the pixels of the input image having a respective standard deviation difference less than or equal to zero; and
repeating determining the average, the standard deviation, the high value regions, the low value regions, and the standard deviation difference for respective pixels of the intermediate mask to determine a high-contrast mask that selects one or more of the high-contrast regions and the text regions of the input image.

6. The device of claim 5, wherein determining the standard deviation difference between the standard deviation of the region and the average of respective standard deviations of each of the high value regions and the low value regions for the pixels of the input image to determine the intermediate mask includes: determining the standard deviation difference between the standard deviation of the region within an additive constant and the average of respective standard deviations of each of the high value regions and the low value regions for the pixels of the input image.

7. The device of claim 1, wherein the motion detector is based on determining temporal differences between a region of the input image and a corresponding region of a previous image of the video stream.

8. A method comprising:
receiving, at a device, an input image from a video stream;
applying, at the device, a high-contrast sharpening filter to the input image to produce a high-contrast sharpened image, the high-contrast sharpening filter configured to sharpen high-contrast regions in images, the high-contrast regions including text regions when present in the images;
applying, at the device, a background sharpening filter to the input image to produce a background sharpened image, the background sharpening filter configured to sharpen other regions of the images different from the high-contrast regions, the background sharpening filter further configured to apply less sharpening to the images than the high-contrast sharpening filter;
determining, at the device, using at least a high-contrast detector, a motion detector and one or more of the input image and previous images from the video stream, one or more masks that select stationary high-contrast regions of the input image, the stationary high-contrast regions including stationary text-regions when present in the input image;
determining, at the device, using at least the one or more masks, a background mask that selects remaining regions of the input image different from respective regions of the input image selected by the one or more masks;
applying, at the device, the one or more masks to the high-contrast sharpened image to select the stationary high-contrast regions from the high-contrast sharpened image;
applying, at the device, the background mask to the background sharpened image to select the remaining regions from the background sharpened image;
combining, at the device, the stationary high-contrast regions from the high-contrast sharpened image and the remaining regions from the background sharpened image to produce a combined enhanced image; and
controlling, at the device, at least one projector to project the combined enhanced image.

9. The method of claim 8, wherein the one or more masks include a single stationary high-contrast mask that selects only the stationary high-contrast regions of the input image, the single stationary high-contrast mask determined using both the high-contrast detector and the motion detector.

10. The method of claim 8, further comprising:
applying one or more smoothing functions to the one or more masks prior to determining the background mask and prior to applying the one or more masks to the high-contrast sharpened image to select the stationary high-contrast regions from the high-contrast sharpened image, such that one or more smoothed masks are used to determine the background mask and select the stationary high-contrast regions from the high-contrast sharpened image.

11. The method of claim 8, wherein the one or more masks include: a high-contrast mask that selects high-contrast regions of the input image, the high-contrast mask determined using the high-contrast detector; and a motion mask that selects moving regions, the motion mask determined using the motion detector, and the method further comprises:
applying a motion sharpening filter to the input image to produce a motion sharpened image, the motion sharpening filter configured to sharpen motion in the images;
determining respective weights to determine a contribution of each of the high-contrast mask and the motion mask to respective regions of the input image corresponding to static high-contrast regions and moving regions;
applying the respective weights to the high-contrast mask and the motion mask to generate: a weighted high-contrast mask that includes higher weights for the static high-contrast regions of the input image than for other regions of the input image; and a weighted motion mask that includes respective higher weights to moving regions of the input image respective other regions of the input image, wherein respective weights for any given pixel of both the weighted high-contrast and the weighted motion mask are normalized;

applying the background mask to the background sharpened image to select the remaining regions from the background sharpened image by: applying the background mask to the background sharpened image to select weighted background regions from the background sharpened image;

applying the one or more masks to the high-contrast sharpened image to select the stationary high-contrast regions from the high-contrast sharpened image by: applying the weighted high-contrast mask to the high-contrast sharpened image to select weighted stationary high-contrast regions from the high-contrast sharpened image; and applying the weighted motion mask to the motion sharpened image to select weighted motion regions from the motion sharpened image, wherein the background mask comprises a weighted background mask determined using the weighted high-contrast mask and the weighted motion mask; and combining the stationary high-contrast regions from the high-contrast sharpened image and the remaining regions from the background sharpened image to produce a combined enhanced image by: combining the weighted stationary high-contrast regions, the weighted motion regions and the weighted background regions to produce the combined image.

12. The method of claim 8, wherein the high-contrast detector is based on:
determining: an average and a standard deviation of pixel values of a region of pixels of the input image around a given pixel; high value regions of the region having respective pixel values above the average; and low value regions of the region having respective pixel values below the average;
determining a standard deviation difference between the standard deviation of the region and an average of respective standard deviations of each of the high value regions and the low value regions for the pixels of the input image to determine an intermediate mask comprising: non-zero value pixels corresponding to the pixels of the input image having a respective standard deviation difference greater than zero; and zero value pixels corresponding to the pixels of the input image having a respective standard deviation difference less than or equal to zero; and
repeating determining the average, the standard deviation, the high value regions, the low value regions, and the standard deviation difference for respective pixels of the intermediate mask to determine a high-contrast mask that selects one or more of the high-contrast regions and the text regions of the input image.

13. The method of claim 12, wherein determining the standard deviation difference between the standard deviation of the region and the average of respective standard deviations of each of the high value regions and the low value regions for the pixels of the input image to determine the intermediate mask includes: determining the standard deviation difference between the standard deviation of the region within an additive constant and the average of respective standard deviations of each of the high value regions and the low value regions for the pixels of the input image.

14. The method of claim 8, wherein the motion detector is based on determining temporal differences between a region of the input image and a corresponding region of a previous image of the video stream.

15. A non-transitory computer-readable medium storing a computer program, wherein execution of the computer program is for:
receiving, at a device, an input image from a video stream;
applying, at the device, a high-contrast sharpening filter to the input image to produce a high-contrast sharpened image, the high-contrast sharpening filter configured to sharpen high-contrast regions in images, the high-contrast regions including text regions when present in the images;
applying, at the device, a background sharpening filter to the input image to produce a background sharpened image, the background sharpening filter configured to sharpen other regions of the images different from the high-contrast regions, the background sharpening filter further configured to apply less sharpening to the images than the high-contrast sharpening filter;
determining, at the device, using at least a high-contrast detector, a motion detector and one or more of the input image and previous images from the video stream, one or more masks that select stationary high-contrast regions of the input image, the stationary high-contrast regions including stationary text-regions when present in the input image;
determining, at the device, using at least the one or more masks, a background mask that selects remaining regions of the input image different from respective regions of the input image selected by the one or more masks;
applying, at the device, the one or more masks to the high-contrast sharpened image to select the stationary high-contrast regions from the high-contrast sharpened image;
applying, at the device, the background mask to the background sharpened image to select the remaining regions from the background sharpened image;
combining, at the device, the stationary high-contrast regions from the high-contrast sharpened image and the remaining regions from the background sharpened image to produce a combined enhanced image; and
controlling, at the device, at least one projector to project the combined enhanced image.

16. The non-transitory computer-readable medium of claim 15, wherein the one or more masks include a single stationary high-contrast mask that selects only the stationary high-contrast regions of the input image, the single stationary high-contrast mask determined using both the high-contrast detector and the motion detector.

17. The non-transitory computer-readable medium of claim 15, wherein execution of the computer program is further for:
applying one or more smoothing functions to the one or more masks prior to determining the background mask and prior to applying the one or more masks to the high-contrast sharpened image to select the stationary high-contrast regions from the high-contrast sharpened image, such that one or more smoothed masks are used to determine the background mask and select the stationary high-contrast regions from the high-contrast sharpened image.

18. The non-transitory computer-readable medium of claim 15, wherein the one or more masks include: a high-contrast mask that selects high-contrast regions of the input image, the high-contrast mask determined using the high-contrast detector; and a motion mask that selects moving regions, the motion mask determined using the motion detector, and execution of the computer program is further for:

applying a motion sharpening filter to the input image to produce a motion sharpened image, the motion sharpening filter configured to sharpen motion in the images;

determining respective weights to determine a contribution of each of the high-contrast mask and the motion mask to respective regions of the input image corresponding to static high-contrast regions and moving regions;

applying the respective weights to the high-contrast mask and the motion mask to generate: a weighted high-contrast mask that includes higher weights for the static high-contrast regions of the input image than for other regions of the input image; and a weighted motion mask that includes respective higher weights to moving regions of the input image respective other regions of the input image, wherein respective weights for any given pixel of both the weighted high-contrast and the weighted motion mask are normalized;

applying the background mask to the background sharpened image to select the remaining regions from the background sharpened image by: applying the background mask to the background sharpened image to select weighted background regions from the background sharpened image;

applying the one or more masks to the high-contrast sharpened image to select the stationary high-contrast regions from the high-contrast sharpened image by: applying the weighted high-contrast mask to the high-contrast sharpened image to select weighted stationary high-contrast regions from the high-contrast sharpened image; and applying the weighted motion mask to the motion sharpened image to select weighted motion regions from the motion sharpened image, wherein the background mask comprises a weighted background mask determined using the weighted high-contrast mask and the weighted motion mask;

and combining the stationary high-contrast regions from the high-contrast sharpened image and the remaining regions from the background sharpened image to produce a combined enhanced image by: combining the weighted stationary high-contrast regions, the weighted motion regions and the weighted background regions to produce the combined image.

19. The non-transitory computer-readable medium of claim 15, wherein the high-contrast detector is based on:

determining: an average and a standard deviation of pixel values of a region of pixels of the input image around a given pixel; high value regions of the region having respective pixel values above the average; and low value regions of the region having respective pixel values below the average;

determining a standard deviation difference between the standard deviation of the region and an average of respective standard deviations of each of the high value regions and the low value regions for the pixels of the input image to determine an intermediate mask comprising: non-zero value pixels corresponding to the pixels of the input image having a respective standard deviation difference greater than zero; and zero value pixels corresponding to the pixels of the input image having a respective standard deviation difference less than or equal to zero; and repeating determining the average, the standard deviation, the high value regions, the low value regions, and the standard deviation difference for respective pixels of the intermediate mask to determine a high-contrast mask that selects one or more of the high-contrast regions and the text regions of the input image.

20. The non-transitory computer-readable medium of claim 19, wherein determining the standard deviation difference between the standard deviation of the region and the average of respective standard deviations of each of the high value regions and the low value regions for the pixels of the input image to determine the intermediate mask includes: determining the standard deviation difference between the standard deviation of the region within an additive constant and the average of respective standard deviations of each of the high value regions and the low value regions for the pixels of the input image.

* * * * *